US008429108B2

(12) United States Patent  (10) Patent No.: US 8,429,108 B2
Eusterbrock  (45) Date of Patent: Apr. 23, 2013

(54) FAST COMPUTATION OF COMPACT POSET ISOMORPHISM CERTIFICATES USING POSITION WEIGHTS

(75) Inventor: Jutta Eusterbrock, Zwingenberg (DE)

(73) Assignee: Geistiges Eigentum, Inc., St. Paul, MN (US)

( * ) Notice: Subject to any disclaimer, the term of this patent is extended or adjusted under 35 U.S.C. 154(b) by 1036 days.

(21) Appl. No.: 12/300,288

(22) PCT Filed: May 11, 2007

(86) PCT No.: PCT/US2007/011429
§ 371 (c)(1),
(2), (4) Date: Nov. 10, 2008

(87) PCT Pub. No.: WO2007/133694
PCT Pub. Date: Nov. 22, 2007

(65) Prior Publication Data
US 2009/0216820 A1    Aug. 27, 2009

Related U.S. Application Data

(60) Provisional application No. 60/799,637, filed on May 11, 2006.

(51) Int. Cl.
G06F 17/00    (2006.01)
(52) U.S. Cl.
USPC .......................................................... 706/45
(58) Field of Classification Search .................... 706/12, 706/45
See application file for complete search history.

(56) References Cited

U.S. PATENT DOCUMENTS

| 6,556,983 | B1 | 4/2003 | Altschuler et al. |
| 6,587,990 | B1 | 7/2003 | Andreev et al. |
| 7,246,331 | B2 | 7/2007 | Ward |
| 2005/0165595 | A1 | 7/2005 | Teig |
| 2006/0036564 | A1 | 2/2006 | Yan et al. |

OTHER PUBLICATIONS

Sartipi, Software Architecture Recovery Based o Pattern Matching, 2003,IEEE, ICSM, pp. 1-4.*
"Affine Isomorphism for Partially Ordered Sets"; Fill, et al; 1999 Kluwer Academic Publishers, pp. 183-193.
"Rodica Simion and Shuffel Posets";Richard P. Stanley; 2002 Advances in Applied Mathematics, pp. 282-284.
"A Term Equality Problem Equivalent to Graph Isomorphism"; David A. Basin; Information Processing Letters, 51(2), 1994; pp. 1-8.

(Continued)

*Primary Examiner* — David Vincent
(74) *Attorney, Agent, or Firm* — Barbara A. Wrigley; Oppenheimer Wolff & Donnelly, LLP

(57)    ABSTRACT

Two methods and systems for fast construction of poset isomorphism certificates are provided. Posets (partially-ordered sets) generalize graphs. The invented certificates are number sequences such that two posets are isomorphic if and only if their corresponding certificates coincide. The first method yields the (Omicron,Iota) poset isomorphism certificate. The minimal Phi-isomorphism certificate can be constructed by partitioning vertices of the graphs into Phi-ranked symmetry clusters and constructing a topological Phi-vertex ranking. Thus, symmetries in posets are detectable at low cost. In addition, the Phi-vertex ranking and a poset isomorphism certificate provide a pair of separate one-dimensional keys for poset encoding. Data objects representable as posets, which are commonly used in automated design, safety and security applications, biocomputing, management of semi-structured data, and other fields, can be stored, analyzed, indexed, and accessed using the isomorphism certificates requiring much less storage and computation time.

6 Claims, 9 Drawing Sheets

OTHER PUBLICATIONS

"Joint Application Mapping/Interconnect Synthesis Techniques for Embedded Chip-Scale Multiprocessors"; Bhattacharyya, et al.; IEEE Transactions on Parallel and Distributed Systems, 16(2), Washington DC; 2005; pp. 99-112.

"Problems Polynomially Equivalent to Graph Isomorphism"; K. Booth, et al.; Technical Report CS-77-04, University of Waterloo, Ontario, Canada, 1979; pp. 2-3, 25-26.

"A survey of shape similarity assessment algorithms for product design and manufacturing applications"; A. Cardone, et al.; Journal of Computing and Information Science in Engineering, 3(2), ASME, New York; 2003; pp. 109-118.

"Matching RDF Graphs"; Jeremy J. Carroll; Technical Report 2001, JP Laboratories, Bristol. HPL-2001-293; 2001; pp. 1-17.

"Enumeration and Motion Planning for Modular Mobile Robots"; Chitta, et al.; Technical Report MS-CIS-01-08, University of Pennsylvania; 2001.

"Exploiting Structure in Symmetry Detection for CNF"; Darga, et al.; in proceedings of the 41$^{st}$ Design Automation Conference; San Diego, California; Jun. 2004; pp. 530-534.

"Canonical Term Representations of Isomorphic Transitive DAGs for Efficient Knowledge-Based Reasoning"; J. Eusterbrock; Proc KRUSE'97 (International Symposium, Knowledge Retrieval, Use and Storage for Efficiency), Aug. 11-13, 1997; School of Computing Science, Simon Fraser University, Vancouver, Canada; ISBN 0-86491-184-x; pp. 235-249.

"Co-Synthesis of New Complex Selection Algorithms and their Human Comprehensible XML Documentation"; J. Eusterbrock; workshop on empirically successful automated reasoning in higher-order logics ESHOL 2005; Montego Bay, Jamaica, Dec. 2, 2005; http://arxiv.org/pdf/cs/0601042; pp. 61-78.

"The Complexity of Comparing Reaction Systems"; Mark Ettinger; Bioinformatics, 18(3); Oxford University press; 2002; pp. 465-469.

"A Performance Comparison of Five Algorithms for Graph Isomorphism"; P. Foggia, et al.; 3$^{rd}$ IAPR-TC-15 Workshop on Graph-Based Representations in Pattern Recognition; Napoli, Italy; 2001; pp. 188-199.

"The NP-Completeness Column"; David S. Johnson; ACM Trans. Algorithms vol. 1, No. 1; 2005; ACM, New York; pp. 160-176.

"Isomorphism of Graphs of Bounded Valence can be Tested in Polynomial Time"; Eugene M. Luks; Journal of Computer System Science (25); 1982; Elsevier, Amsterdam; pp. 42-65.

*nauty* User's Guide (Version 2.2), Brendan D. McKay; Computer Science Dept. Australian National University ACT 0200 Australia; http://cs.anu.edu.au/~bdm/nauty/nug.pdf (Jun. 9, 2009); pp. 1-33.

"Graph Isomorphism, General Remarks"; Gary L. Miller; In STOC '77: Proceedings of the ninth annual ACM Symposium on Theory of Computing; 1977; New York; ACM Press; pp. 143-150.

"Comparing Binaries with Graph Isomorphism"; T. Sabin; http://www.bindview.com/Services/Razor/Papers/2004/comparing_binaries.cfm (2006).

"Pictographic Matching: A Graph-Based Approach Towards a Language Independent Document Exploitation Platform"; M.A. Walch, et al.; In HDP '04: Proceedings of the 1$^{st}$ ACM workshop on hardcopy document processing; New York, NY; 2004; pp. 53-61.

\* cited by examiner

FAST COMPUTATION OF COMPACT POSET ISOMORPHISM CERTIFICATES USING POSITION WEIGHTS

BACKGROUND OF THE INVENTION

1. Field of the Invention

The present invention relates to a method and system for constructing compact partially ordered sets (posets) isomorphism certificates useful for comparing digital objects representable as posets. The present invention specifically relates to a method and system for fast construction of an (Omicron (P),Iota(P)) certificate, a minimal Phi(P) certificate and Phi-ranked symmetry classes for posets and their induced usages. Each poset certificate is a canonical representative for a class of isomorphic posets. The present invention provides a pair of one-dimensional keys for encoding a poset which enables compact storage.

2. Discussion of the Related Art

Many kinds of objects or data like genetic maps, multiple sequence alignments or taxonomies can be usefully represented by posets. Posets can be seen as generalizations of arbitrary graphs and lattices. Graphs are configurations described by vertices or nodes and connections or edges. They are widely used for analyzing physical networks such as transportation networks, computer networks, electrical circuits, and the Internet, VLSI design, robotics, compilers, modeling document structure using XML, programs using data flow graphs, or chemical compounds where atoms and bonds are modeled as vertices and connections, respectively and enumerating structural possibilities, including chemical structures (e.g., hydrocarbons, drug compounds, and polymer networks), genetic and biochemical networks. Graphs have also have been used for analysis of RNA structures. Furthermore, graphs are used to model financial networks, for example, market graphs or the losses flow across a network of banks. Lattice models form the standard way to valuing stock options. In many cases, the term semi-structured data appears to be accepted for data that is described using basic graph theory.

The term "poset" refers to a partially ordered set with strict partial order. Analyzing posets with strict partial order for isomorphism is no restriction of the general case. A strictly partially ordered set is a pair (V,>), consisting of an ordering relation '>' and a set of objects or vertices V, named "base set", such that for any two objects x,y in V either (1) x>y or (2) y>x; or (3) x and y are unrelated. For any two objects x,y in V holds: (1) not x>x, (2) if x>y, then not y>x, and also (3) if x>y, and y>z, then x>z. Two posets $(V_1, >_1)$, $(V_2, >_2)$ are said to be isomorphic if there exists a mapping pi: $V_1 \Leftarrow V_2$ such that for all x,y in $V_1$, $x >_1 y$ if and only if $pi(x) >_2 pi(y)$. Again, an isomorphic mapping of the vertices onto themselves is an automorphism. When the number of objects and relations of a poset is large, no efficient (non-exponential) method to test whether two arbitrary posets are isomorphic is known. Checking isomorphism of a pair of posets typically requires exponential worst-case time. In a poset database, not only is comparing individual posets difficult, it is also required to perform the comparison operation with all posets in the database. The complexity is twofold: (1) search for candidate members to match among the huge number of candidates, and (2) check isomorphism with the retrieved candidates. The total number of poset isomorphism classes grows exponentially with the number of vertices of the poset.

Since the number of poset isomorphism classes is exponential in the number of vertices, even a linear time isomorphism algorithm will result in a potentially exponential search if a query object needs to be compared to all represented poset classes. In current systems, an object can be accessed in O(log(|E|)) time, where |E| denotes the number of entries if the data objects are sorted based upon a numerical ordering. This leads to the question whether "certificates" for poset isomorphism classes exist. A function f from a class of objects C to the natural numbers is called a "certificate" with respect to some equivalence relation like isomorphism if and only if it has the following properties: (i) supposing $f(P_1)=f(P_2)$, then $P_1$ is equivalent to $P_2$; and (ii) supposing $P_1$ is equivalent to $P_2$, then $f(P_1)=f(P_2)$ for all pairs of objects $P_1, P_2$ in C. f is a "deterministic certificate", if f is a certificate and f is computable in polynomial time. In current systems, no deterministic certificate with respect to isomorphism is known for arbitrary posets. However, there exists a need for deterministic certificates for arbitrary posets.

Identifying symmetries is another important application of poset isomorphism. An automorphism is an isomorphic mapping of the vertices onto themselves. The set of all automorphisms of a given poset is the base of the automorphism group of the poset. The automorphisms of a poset define the automorphism partition of its vertices in the following way: two vertices $v_1, v_2$ are in the same class if there exists an automorphism which maps $v_1$ onto $v_2$. Poset automorphism may be used as a framework for modeling symmetry. By exploiting symmetries one can often save an exorbitant amount of time when only considering representatives of classes of symmetric but equivalent variables. Hence, symmetry detection and reduction is often crucial to the success of making reasoning and equation solving problems computationally tractable.

Those skilled in the art are familiar with the graph isomorphism problem that includes deciding whether two given graphs are isomorphic, i.e. whether there is a one-to-one mapping (a permutation) from the vertices of one graph to the vertices of the second graph, such that the edge connections are respected. As those skilled in the art recognize, the graph isomorphism problem can be efficiently translated into a poset isomorphism problem. In particular, undirected graphs can be considered as bipartite posets since any graph can be transformed into a bipartite poset by replacing each edge by two directed edges connected with a new vertex. Hence the pair of edges which are connected with the upper vertices of this bipartite poset refer to the edges and the lower vertices to the vertices of the original graph.

Much research has been devoted to the graph isomorphism problem. Apart from the present invention, neither an efficient (polynomial) worst-case algorithm to check whether two arbitrary graphs are isomorphic is known nor has the conjecture been proved that such an algorithm can exist. Certain complexity-theoretic evidence suggests that it is unlikely to be NP-complete. When the class of graphs to be dealt with is restricted, in many cases the resulting less complicated isomorphism problem can be solved by polynomial-time algorithms. For example, if the vertex degrees are bounded by a constant, Luks's group-theoretic algorithm performs isomorphism testing in polynomial time. There are a number of general graph isomorphism algorithms, but there are always cases for which the known algorithms are not efficient or not even able to find any solution at all. Furthermore, no construction is known that would enable a quantum computer to check graph isomorphism in polynomial time. Graph isomorphism is in contrast to subgraph isomorphism in which the problem is to decide whether there is a subgraph of the first graph that is isomorphic to the second graph. The subgraph isomorphism problem is known to be NP complete. Despite the previously mentioned advances, there exists a need for an efficient (polynomial) worst-case method and system to determine whether two arbitrary graphs are isomorphic.

The correspondence between poset and graph isomorphism implicates that whenever an efficient system for handling classes of isomorphic posets is devised, then an efficient system for processing a collection of graphs can be constructed by augmenting the poset encoding system by a pre- and post-processing unit which converts graphs into designated posets and vice-versa. There are many problems of theoretical, practical and technical relevance which can be efficiently translated into graph isomorphism problems. A problem is said to be graph isomorphism-complete if it is provably as hard as graph isomorphism. Deciding if two terms contain otherwise uninterpreted associative, commutative, and associative-commutative function symbols and commutative variable-binding operators are equal is efficiently reducible to determining if two graphs are isomorphic. The problems of testing either two semi groups, context free grammars or two finite automata for isomorphism have also be shown to be efficiently reducible to graph isomorphism. In addition, RDF model equality is graph—isomorphism complete.

These and many other practically relevant applications require a fast algorithm for checking isomorphism of two graphs. Checking isomorphism of two graphs is of critical importance in numerous practical areas such as chemistry, bioinformatics, cryptography, switching theory, program analysis, computer aided design, program verification, safety and security checking, computer vision, object recognition, multimedia document management, networking, robot construction, mechanical engineering, etc. In most cases, the task at hand includes both comparing pairs of graphs and searching large databases or even the Internet and retrieving isomorphic (similar) objects. With the ever growing body of data, it will be necessary to perform millions of comparisons within a database. However, a certificate for a graph in polynomial time could be applied once to construct a certificate code(G) for a given graph, and then, in average time $O(|code(G)|*\log(N))$, the certificate for the given graph could be compared to certificates stored in a database sortable according to the certificates. Thus, there exists a need for a system and method employing a deterministic polynomial-time computable certificate to be used for general graph isomorphism.

Following are some specific exemplary applications having a need for a fast algorithm for checking isomorphism of two graphs, including some of the unique issues associated with each application:

(1) Computer Aided Design

In engineering, complex systems are usually described as a configuration of smaller components. A configuration can be viewed as graph of interconnected components. An inherent difficulty in solving configuration problems is the existence of many structural isomorphisms. One of the motivations for performing part similarity assessment is to locate similar parts or components in a large database or even the Internet. Popularity of 3D CAD systems in product design and manufacturing industry is resulting in a large number of CAD models being generated. The techniques to assess similarity of 2D models do not extend to 3D models. Similarity assessment in 3D cases is usually carried out by generating shape certificates from the 3D models and then comparing these certificates using suitable distance functions. One technique is to use graphs as shape certificates for 3D models. The comparison can then be carried out by graph isomorphism testing. Techniques based upon graph isomorphism are used to pare the design space for high-level scheduling and interconnect topology synthesis for embedded multiprocessors. Only isomorphically unique graphs are considered. The result is a reduction by orders of magnitude. Instances of the Boolean satisfiability problem (SAT) arise in many areas of design automation that comprise microprocessor verification and FPGA layout. It has shown that exploiting symmetries results in vastly reduced SAT solver run times. Symmetry detection may be performed by constructing a graph from the conjunctive normal form, and obtaining a generating set of the automorphism group of the graph. Moreover, symmetry-based reduction techniques have been successful used in synthesis of logic circuits and DSP algorithms. There exists a need for fast symmetry detection in order to reduce overall computation time.

(2) Machine Vision and Pattern Recognition

Graph isomorphism has been used for object recognition and classification tasks as those that exist in a robot workspace. A reliable and simple method for detecting isomorphism between pairs of kinematic chains such as robots and machine tools is also desirable. Further applications of graph isomorphism checking include low-level image, facial, character or graphical symbol recognition. It has been argued that better graph isomorphism methods can be used to improve the procedures to properly match the ridges of fingerprint images. Graph isomorphism is also an essential technique underlying Pictographic matching.

(3) Safety and Security Analysis

Methods and algorithms for finding differences between two versions of a binary executable file based on graph isomorphism are known. A method that allows to iteratively construct an isomorphism between two differing but similar executables is also known. Such an isomorphism has multiple interesting applications: It allows rapid reverse engineering of security updates, automatic classification of malware and detection of code theft. Systems for safety checking on systems with pointers have been devised but the bottleneck in these systems is the exponential runtime complexity caused by checking graph isomorphism. Checking properties of state spaces that are generated by model-checking also involves isomorphism testing. Dynamic data-structures with pointer links cause extremely difficult verification problems. Automorphism symmetry reduction techniques have been investigated for the verification of software systems with indirect reference chains. There exists a need for a practical framework for the efficient verification of such software systems. Graphs with millions of vertices or more are prevalent in many domains. It has been shown that the correctness of a VLSI circuit layout can be verified by utilizing techniques for solving the classical graph isomorphism problem. These tools currently are not effective enough to verify circuits containing tens of millions of transistors. Prepositional logic formulas generated to model verification problems often exhibit considerable structural symmetry—there exist many rearrangements of the variables which yield the same formula. Exploiting symmetries can often reduce the complexity of reasoning. However, it can be expensive to compute the full equivalence class based on known techniques. Accordingly, there exists a need for detecting symmetries using graph isomorphism techniques.

(4) Chemical and Biological Databases

Graph data management has long formed the basis for chemical and biological information retrieval systems. The chemical industries have created extensive databases of both 2D and 3D structures of chemical molecules and a variety of data mining tools are routinely used to support the discovery of novel pharmaceuticals and agrochemicals. The principal method of representation for a 2D chemical structure or 3D molecule is a labeled graph in which the vertices and edges of a graph represent the atoms and bonds, respectively, of a molecule. Many kinds of data arising in bioinformatics can be usefully represented as graphs. Biopathways are among the most important examples of such graph data. It has been shown that comparing the stoichiometric structure of two reactions systems as a crucial problem in understanding the mechanisms encoded in the genome is equivalent to the graph isomorphism problem. A chemical and/or biological database can hence be represented by a large number of particular graphs. Structure searching involves an exact-match search of a chemical and/or biological database for a specific query structure. Such a search involves a graph isomorphism search, in which the graph describing the query is checked for isomorphism with the graphs of the database graphs. There exists a need for applying efficient graph isomorphism techniques to conduct this type of search.

(5) Knowledge, Multimedia and Document Management

In many other domains, graphs in various forms provide the underlying concept for modeling objects and processes. For instance, software engineering employs a number of modeling approaches (eg. computer programs), languages (eg. UML), and ISO Standards based on graphs to capture non-linear aspects of workflows, data flows, data dependencies, project organizations, vector based graphics, etc. Web computing combines the graph-based approaches from a variety of disciplines: Objects, documents, and services are represented using HTML and XML, meta data is captured using numerous formats based on XML and RDF. But also the web as a whole is subject to modeling approaches, web graphs play a vital role in search engine design and operation. In addition, a variety of application domains depend on graph-based models, for instance, linguistic expressions, customer relationship models in e-commerce or market models in financial optimization approaches. Model searching involves an exact-match search of a database for a specific query. Such a search involves a graph isomorphism search, in which the graph describing the query model is checked for isomorphism with the graphs of the database graphs. There exists a need for an efficient method for retrieving isomorphic graphs.

(6) Compact Encoding

In an embedded system, instructions permanently reside, for example, in a ROM or flash memory chip. The cost of storing the instructions on a chip can be as high as the cost of a micro processor. Compressing a code to reduce the amount of memory required is an attractive way to reduce costs. Some RISC processors support aggressive code size reduction even at the cost of significant performance loss. Code compression is the technique of using data compression to reduce the code memory size for memory-limited, embedded computers. The instructions are compressed and stored in the embedded system. At run-time, the compressed instructions are incrementally decompressed and executed. While compressed codes have better density, their performance is typically lower because additional effort is required to decompress the instruction stream. It has been shown that the sequence of instructions can be encoded by a data flow graph. Consequently, there exists a need for an improved physical process in which instructions are efficiently and without any redundancies compressed.

(7) Coding Schemes and Storage of Semi-Structured Data

Scientific, governmental and industry consortiums generate standards in the form of digraphs such as the Gene Ontology digraph, the ICD-9 and ICD-10 medical naming convention, or SNOMED. A unified coding scheme for consistent mechanism representation is developed by identifying non-isomorphic contracted graphs, as well as a unique numbering for the higher order links in them, providing a consistent coding scheme for all classes of mechanisms. Data is then associated with these classifications and a complex semi-structured dataset emerges. Scientific work relating to the exploration of the human and other genomes has produced massive data that cross-references complex graphs and structures. Indexing of semi-structured tree data is being addressed by all the major database vendors in one form or another, such as is evident for example in both the DB2 database system from IBM and in Oracle's database system. Unfortunately, relational databases do not effectively support data schemata with multiple hierarchies to manage this sort of data and they lack facilities to access data by hierarchical queries. Numerous approaches to devise database systems to handle semi-structured data objects, which are also represented in other formats such as XML (Extensible Markup Language), are used to attempt to overcome the access problem. Despite these efforts, there still exists a need for a carefully formulated method and system for capturing all relevant members of an isomorphic class of objects and retrieving those data objects that are isomorphic to a requested item.

(8) Efficient Physical Storage and Transfer of Huge Objects

Encoding a small poset structure is simple. Storing and transferring a poset with massive amount of vertices and edges in memory constrained systems or with limited space on physical devices is an engineering challenge. Models of transportation networks, power grids, computer networks (eg., the Internet), social networks, intranets of large corporations are represented as graphs. Another example of a huge graph is the Web graph. A Web graph represents the link structure of the WWW, and can be used to study various properties of the Web. There are a variety of distinct encoding objectives which are considered: (1) Compressing the underlying graph for storage or transmission, up to isomorphism. This setting is useful if only the graph structure itself shall be stored. (2) Compressing the underlying graph for storage or transmission, maintaining the information associated with the vertices of the graph. (3) Compressing the underlying graph that still allows for efficient computation on the compressed form. Matrix representations which are very common for storing the web graph are extremely large and sparse which makes it impossible to keep them in memory. Efficient compression methods are required and are subject of ongoing empirical research. There exists a need for a method and system for providing very compact encoding of sparse graphs, not requiring further compression.

SUMMARY OF THE INVENTION

Many digital data objects used in technical and economical applications are representable as partially ordered sets (posets). A fundamental result of the present invention relates to the efficient (non-polynomial) construction of isomorphism certificates for arbitrary posets in the form of finite number sequences. The number sequences exactly distinguish between classes of isomorphic and non-isomorphic posets and, thus, the present invention provides a method and system for isomorphism checking of posets which is fast and efficient. As the certificates are represented by number sequences, they define a numerical ordering on the isomorphism poset class representatives which enable to compare and arrange them. Those skilled in the art recognize that a number of objects, especially graphs can be efficiently transformed into posets and consequently the invention provides an efficient method for constructing isomorphism certificates for graphs. The present invention apparently is the first to provide an efficient method for isomorphism checking of arbitrary posets and graphs, and in addition a means for comparing a pair of arbitrary posets.

The certificates allow users to organize knowledge on posets or graphs in search trees using the certificates as indexes. This way, logarithmic time search and update operations are achieved. For instance, retrieving a particular poset with 11 vertices that is isomorphic to one of the possible 46,749,427 non-isomorphic posets with 11 vertices in a database requires 26 matching tests when the database entries are indexed by their certificates. Using tuples for poset representation, the problem of structural isomorphism testing at each stage has been converted to one of numeric comparisons, something which is comparatively extremely efficient.

The present invention provides a practical framework to achieve a number of tasks, including: (1) using the certificates for efficient poset isomorphism testing by comparison of the certificates, clustering posets according to the measures provided by the numerical certificates, and thus building up efficient poset databases; (2) efficient detection of symmetries and ranking of symmetry classes which in combination with symmetry reduction techniques enables efficient automated design and verification, especially of hardware and software systems, and (3) compact encoding of poset representable data based upon a pair of keys, an isomorphism certificate and the canonical Phi-alpha topological sort of the vertices.

The present invention specifically relates to a method for fast construction of an (Omicron(P),Iota(P)) certificate, which is then used to determine the Phi-ranked symmetry classes, further to determine a designated topological sorting of the vertices, the Phi-alpha sort and finally to construct the Phi(P) isomorphism certificate. The Phi(P) poset isomorphism certificate is a code which is minimal among all codes which represent a poset P' which is isomorphic to P. The Greek letter Phi is used herein to symbolize the fusion of the Omicron and Iota codes. In addition, the present invention provides a pair of keys that uniquely determine posets: the canonical topological Phi-alpha sort of the vertices of a poset as a first key and the Phi- or (Omicron,Iota) isomorphism certificate as a second key. The Phi-keys can be stored separately.

The present invention provides an efficient method and system for detecting symmetries and ranking symmetry classes. Symmetry reduction can be used to obtain sub-problems which are computationally tractable or can greatly improve the performance of known design and verification tools. Groups of vertices that are related and have strong interconnections are automatically identified by the Phi-symmetry ranks. In addition, the present invention provides compact Phi-key pairs that uniquely determine posets. The Phi-keys can be stored separately on a variety of storage devices.

The present invention provides a carefully formulated method and system for compact storage. In particular, a mechanism is provided for the management and analysis of huge amounts of semi-structured data which is cross-referenced by a common poset structured schema: (1) the Phi-code of the schema is determined and physically stored, (2) for each record, the Phi-alpha-sequence of the vertices of the structured data set are determined and stored on a single or a collection of distributed physical storage media. The Phi-alpha-encoding requires significantly less storage space while maintaining the multi-hierarchical structures which can be efficiently reconstructed by decoding the Phi-alpha-sequence in combination with the Phi-code. The present invention enables more compact physical storage of physical objects, class representatives and corresponding information that can be represented as posets on a physical medium. In particular, it provides compact storage of programs. In doing so statements are efficiently compressed by generating a (1) Phi-alpha-sequence and a (2) Phi-code based on the program such that the Phi-alpha sort of the instructions is stored in a storage media and, at run-time, is efficiently decompressed and transformed into a data flow graph by a processor, having read the Phi-code from a storage medium. The present invention further provides a method and system for providing very compact encoding of sparse graphs, not requiring further compression.

The present invention provides a solution to the problem of managing large volumes of poset and graph structured data, including but not limited to chemical structures, Internet, image, construction data, and the like. In addition to the features and characteristics outlined above, the present invention accelerates selection of candidates potentially identical, isomorphic or similar to given reference objects without processing all of the data contained in the physical storage medium, and checking those candidates efficiently for isomorphism and if required to determine the isomorphism mapping. This is implemented by building and maintaining indexes and naming schemes that are based on the invented certificates.

The invention provides a method and device for comparing a plurality of poset representable digital data objects $D_1, \ldots, D_n$ and arranging them in sorted clusters on a computer system comprising the steps of: converting each digital data object D into a poset P; using the Omicron-Iota (Pj), j=1, ..., n, codes of the corresponding posets $P_1, \ldots, P_n$; whereby: (i) for each pair of objects D',D" in the same cluster the associated Omicron-Iota poset codes are identical, whereby identity of (Omicron(P'),Iota(P')) and (Omicron(P"),Iota(P")) for a pair of posets P',P" taken from the set $P_1, \ldots, P_n$, certifies that P' is isomorphic to P", and non-identity certifies that the pair P',P" is non-isomorphic, and (ii) the clusters are sorted according to the ordering induced by the corresponding (Omicron,Iota) codes.

Further, the invention provides a method and device for detecting symmetric vertices of digital data objects on a computer system, comprising the steps of: converting a digital data object D into a poset P; assigning to each poset vertex v its Phi-symmetry rank Phi-sym(v) such that (i) symmetric vertices have identical Phi-symmetry rankings, (ii) the Phi-symmetry ranks for pairs of non-symmetric vertices differ, and (iii) the Phi-symmetry-ranking results in a strict linear order for the Phi-symmetry ranks of the vertices.

The invention will be further described with reference to the following detailed description taken in conjunction with the drawings.

BRIEF DESCRIPTION OF THE DRAWINGS

FIG. 2.a is a flowchart showing the process of isomorphism certification of a pair of posets. FIG. 2.b demonstrates the construction of an isomorphic mapping between a pair of posets. FIG. 2.c demonstrates the poset encoding by a pair of separate keys, the Phi-alpha vertex ranking together with an isomorphism certificate.

4a where each vertex is assigned its corresponding Phi-symmetry rank and its corresponding topological Phi-vertex rank.

Figure 5:
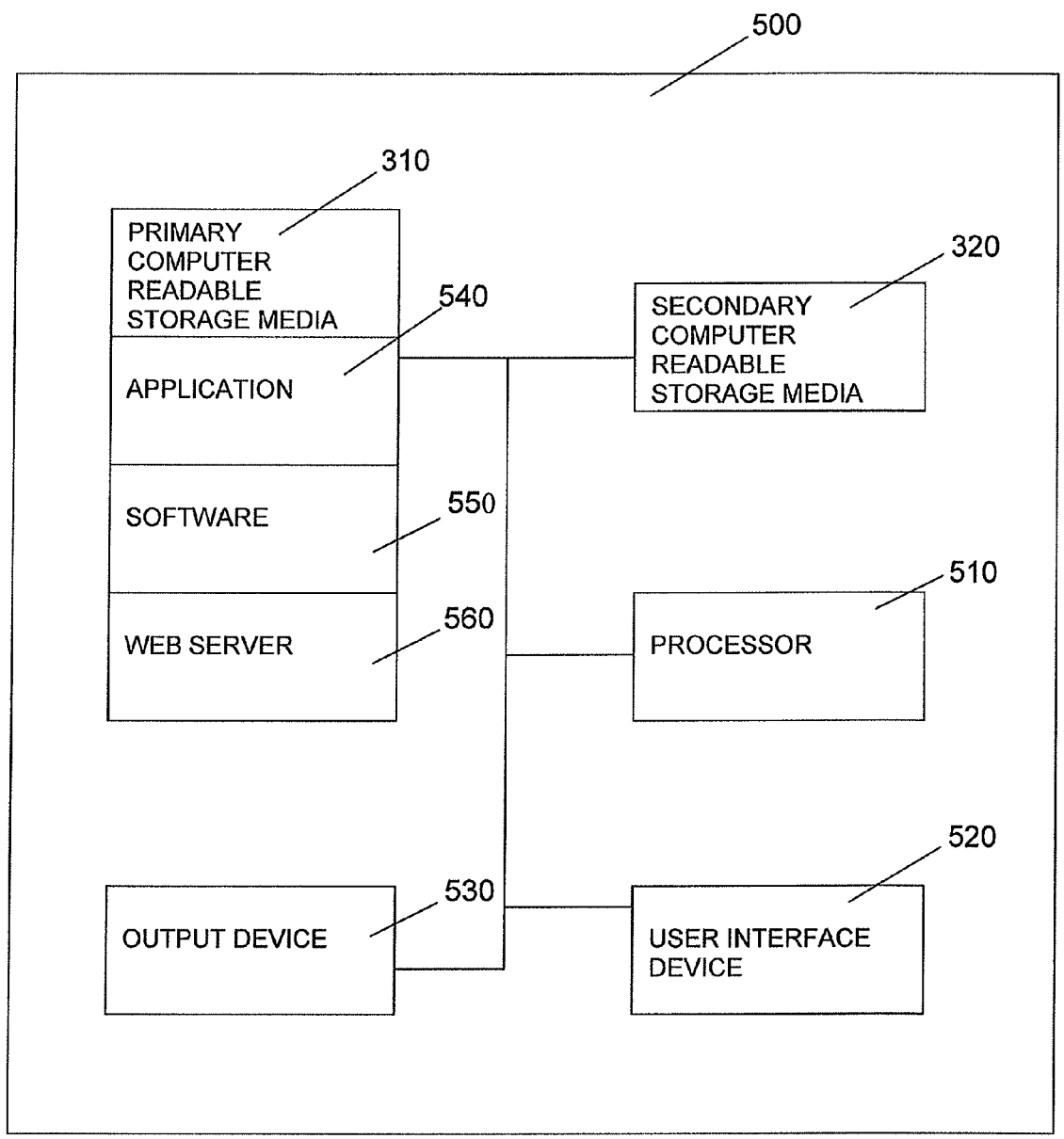

FIG. 5 is a block diagram of the exemplary components of an electronic processing device used in accordance with the present invention.

Figure 6:
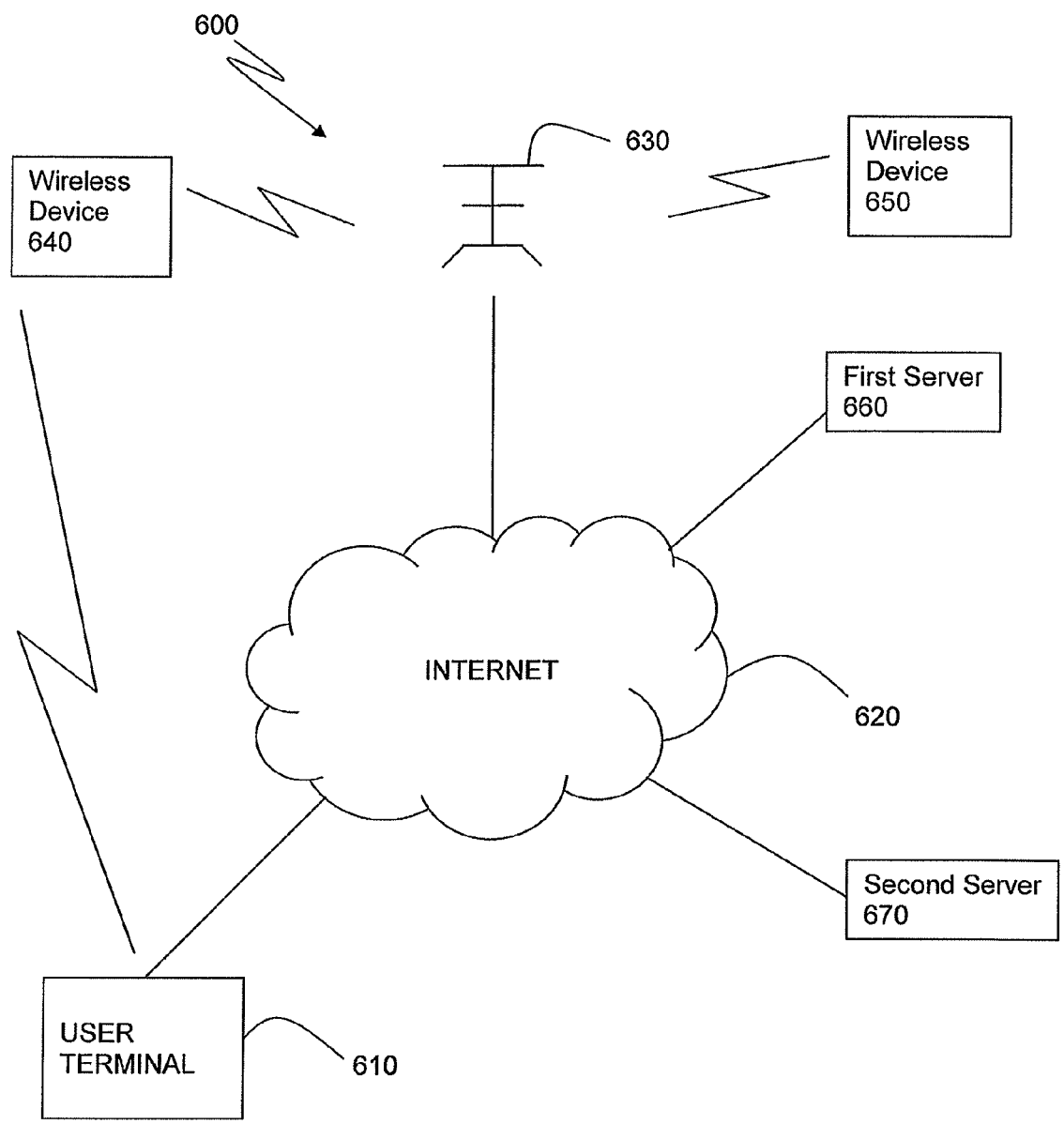

FIG. 6 is a block diagram of a network arrangement in accordance with one embodiment of the present invention.

DETAILED DESCRIPTION

In the following description numerous specific details are set forth in order to provide a thorough understanding of the present invention. However, it will also be apparent to one skilled in the art that the present invention may be practiced without the specific details. In other instances, well-known materials or methods have not been described in detail in order to avoid obscuring the present invention. However, it will be apparent to those skilled in the art that the present invention may be practiced with only some or all aspects of the present invention. For purposes of explanation, specific numbers, materials and configurations are set forth in order to provide a thorough understanding of the present invention.

The term "poset" refers to a partially ordered set with strict partial order. A partially ordered set with strict partial order P is a pair (V,>), consisting of an ordering relation '>' and a set of objects or vertices V, named "base set", that for any two objects x,y either (1) x>y; or (2) y>x; or (3) x and y are unrelated. For any two objects x,y: (1) not (x>x), (2) if x>y, then not (y>x) and (3) if x>y, and y>z, then x>z. Analyzing posets with strict partial order for isomorphism is no restriction of the general case. Two posets $(V_1,>_1)$, $(V_2,>_2)$ are said to be isomorphic if there exists a mapping pi: $V_1 \Leftarrow V_2$ such that for all x,y in $V_1$, $x>_1 y$ if and only if $pi(x)>_2 pi(y)$. Again, an isomorphic mapping of the vertices onto themselves is an automorphism. The automorphisms of a poset define the partition of its vertices into symmetry classes in the following way: two vertices v',v" are symmetric if there exists an automorphism which maps v' onto V".

A strict poset (P,>) is considered to be represented by a set of pairs $(v_i,v_j)$ which indicate $v_i>v_j$. A strict poset is a specific directed graph. Hence we use graph concepts to refer to specific entities. The indegree of a vertex refers to the number of immediate predecessors of a vertex, the outdegree refers to the number of immediate successors of a vertex. A pair of vertices is named neighbors if they have a common immediate predecessor or successor. It is assumed that posets are connected and rooted. This is no restriction of the general case, as given an arbitrary unrooted poset P with maximal vertices $(v_1, v_2, \ldots, v_d)$, adding a new vertex v and the relations $(v,v_1)(v,v_2), \ldots, (v,v_d)$ to P yields a rooted, connected poset which preserves isomorphism properties. Given a first sequence $S'=(s_1', \ldots, s_q')$ and second sequence $S''=(s_1'', \ldots, s_r'')$, then (1) append $(S',S'')=(s_1', \ldots, s_q', s_1'', \ldots, s_r'')$ denotes their concatenation, (2) S'=S" if $s_1'=s_1'', \ldots, S_q'=S_r''$ or S'>S" if there is an i,i=0, ..., $s_{q-1}'$ such that $s_1'=s_1'', \ldots, s_i'=s_i''$ and $s_{i+1}'>s_{i+1}''$.

Figure 1:
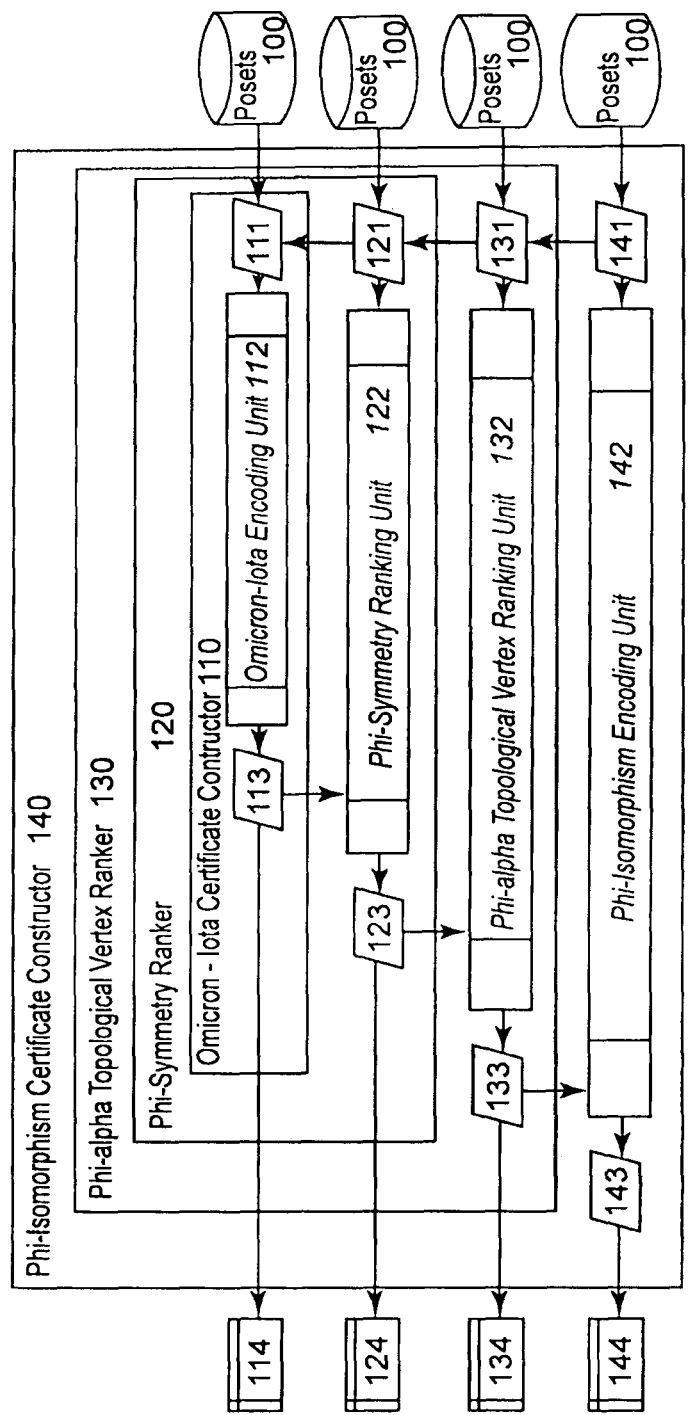
FIG. 1 illustrates the hierarchical relationships between the present innovated methods.

Referring now to FIG. 1, there is shown one embodiment of a system in accordance with the present invention. Computer readable storage media 100 store one or a plurality of partially ordered sets and transmits them to connected components 140, 130, 120, 110. These components are hierarchically configured of independent sub-components being interconnected via data transmitting and receiving means. Each sub-component may access a computer writable storage media. The media 144, 134, 124, 114 are configured to store at least one Phi-isomorphism certificate 143, topological Phi-vertex ranking 133, Phi-symmetry ranking 123 and (Omicron,Iota) isomorphism certificate 113 respectively.

In one aspect of the present invention, the (Omicron,Iota) certificate constructor 110 receives a poset 111 for which the fast Omicron-Iota encoding unit 112 constructs the (Omicron,Iota) certificate 113 which represents the class of posets which are isomorphic to the received poset 111. In another aspect of the present invention, the Phi-symmetry ranker 120 constructs the Phi-ranked automorphism partition of the vertex set. The Phi-symmetry ranker 120 receives a poset 121, and transfers it to the (Omicron,Iota)—certificate constructor 110 which constructs the (Omicron,Iota) certificate 113. The certificate 113 is received by the Phi-symmetry ranking unit 122 and then used to construct the ranked Phi-symmetry partition 123. The Phi-alpha topological vertex ranker 130 determines the topological and canonical Phi-alpha-ranks of the vertices of a poset. The Phi-alpha topological vertex ranker 130 receives a poset 131, transfers it to the Phi-symmetry ranker 120 which partitions the vertices into symmetry classes and ranks the classes and outputs the result 123, which is then used by the topological Phi-alpha topological vertex ranking unit 132 for constructing the topological Phi-vertex ranking 133. The Phi-certificate constructor 140 receives a poset 141 and transfers it to the Phi-topological vertex ranker 130 which constructs the topological Phi-vertex ranking 133 and which then is received by the Phi-Isomorphism encoding unit 142 and used to construct the Phi-isomorphism certificate 143 which represents the class of posets which are isomorphic to the received poset 141.

Isomorphism Certification and Construction

Figure 2A:
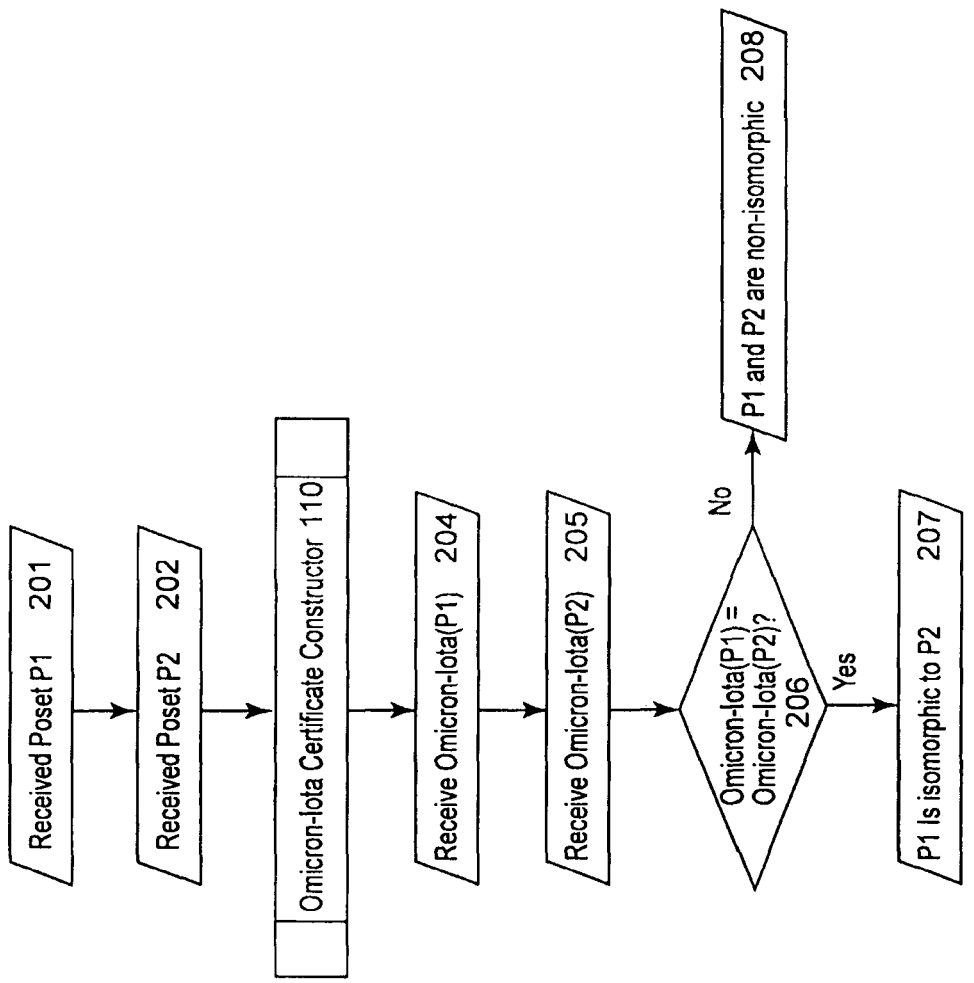
FIG. 2.a, 2.b, 2.c and 3 illustrate a few of the many potential applications of the invention.
Figure 2B:
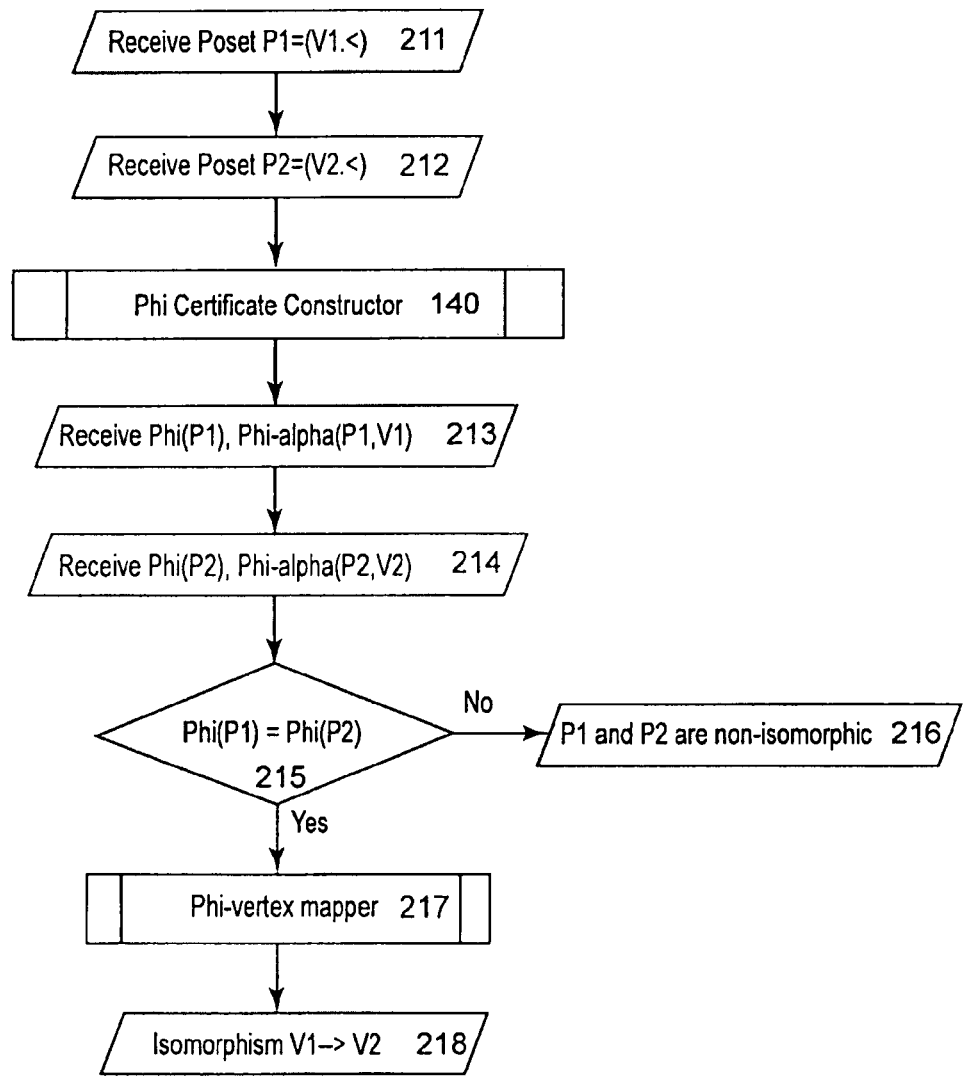

Given a pair of posets $P_1$, $P_2$ with n vertices and vertex sets $V_1$, $V_2$. The two posets $P_1,P_2$ can have none, one or more isomorphism. In yet another aspect of the present invention, an isomorphism certifier ascertains isomorphism or non-isomorphism by comparing the (Iota,Omicron) or Phi-codes of $P_1$ and $P_2$. There is at least one isomorphism between the vertices in $V_1$ and $V_2$ if $Phi(P_1)=Phi(P_2)$ or $(Iota(P_1),Omicron(P_1))=(Iota(P_2),Omicron(P_2))$. Given a Phi-alpha topological vertex ranking $Phi(P_1,V_1)$ and a Phi-alpha topological vertex ranking $Phi(P_2,V_2)$, an isomorphism mapping $pi:V_1 \Leftarrow V_2$ is constructed by successively selecting the i-th element of Phi $(P_1,V_1)$, i=1, . . . , n and mapping it onto the i-th element of $Phi(P_2,V_2)$. The isomorphism-certifier as illustrated in FIG. 2.a receives a first poset $P_1$ 201, and a second poset $P_2$ 202 and certifies isomorphism 207 or non-isomorphism 208 between the pair of posets. It creates the (Omicron,Iota) encoding 204 of $P_1$ and the (Omicron,Iota) encoding 205 of $P_2$ using the (Omicron,Iota) constructor 110. In addition to certifying isomorphism or non-isomorphism, the Phi-vertex mapper 217 as illustrated in FIG. 2.b creates an isomorphism mapping if it exists. It constructs the Phi-certificate $Phi(P_1)$ and the Phi-alpha-topological vertex ranking $Phi(P_1,V_1)$ 204 for a first poset $P_1$ 201 and the Phi-certificate $Phi(P_1)$ and the Phi-alpha-topological vertex ranking $Phi(P_1,V_1)$ 205 for a second poset. If they are non-identical, non-isomorphism 216 is certified. If an isomorphism exists, the isomorphism vertex mapper 217 constructs the Phi-alpha-isomorphism 218 by mapping the i-th element of Phi-alpha$(P_1,V_1)$ onto the i-th element of Phi-alpha$(P_2,V_2)$ and i passes through 1 to the cardinality of the vertex set.

Poset Encoding by Pairs of One-Dimensional Keys

Figure 2C:
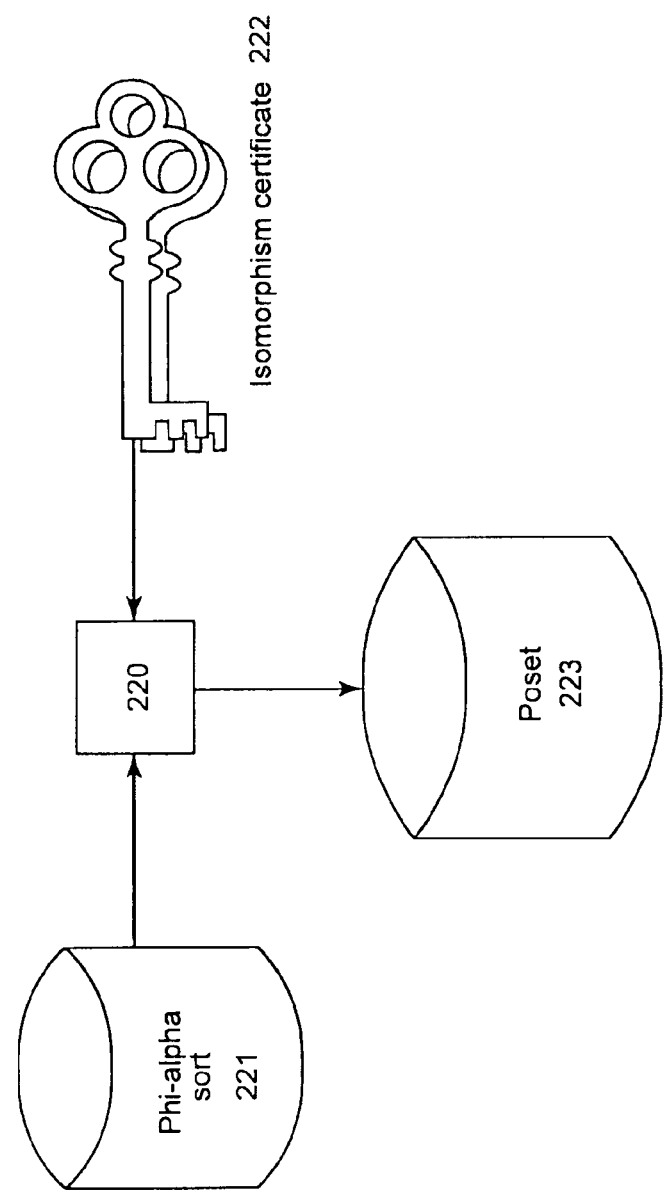

The Phi-alpha vertex ranking together with a certificate provides a pair of separate keys for poset encoding. In a prototypical setting as illustrated in FIG. 2c, one or a multitude of Phi-alpha sorts of a poset P is stored in a storage medium 221, which is accessed by a processor unit 220 that is provided with a "key" 221—the Omicron-Iota isomorphism certificate or alternatively the Phi-isomorphism certificate—enabling the processor unit to reassemble the poset with all structural information and store it in a storage medium 223. Given only one key, however, it is almost impossible to reconstruct the object granted it is of reasonable size and complexity. Therefore, the invention provides means for low-cost transfer or storage of complex information entities, eg. biomolecular datasets, which is also secure due to an intrinsic encryption mechanism (which may as well be used in other security application, such as authorization and certification).

Indexing and Searching Poset-Representable Data

The disclosed (Iota,Omicron)- and Phi-sequences can be used to create lexicographic indexes on poset expressions and their corresponding information in a database system. A Phi-poset data storage is a data storage in which at least one digitized poset expression is stored together with associated information using the Phi or (Iota,Omicron) certificates or variants of them as ordered indexes.

Using the properties of the total lexicographic ordering, the poset data sets can be sorted, arranged in a hierarchical structure or clustered based upon the invented (Iota,Omicron)-codes or Phi-codes as augmented indexes. Such structuring and sorting techniques are known from prior art technology once an indexing function has been defined and enable fast access and compact storage.

Figure 3:
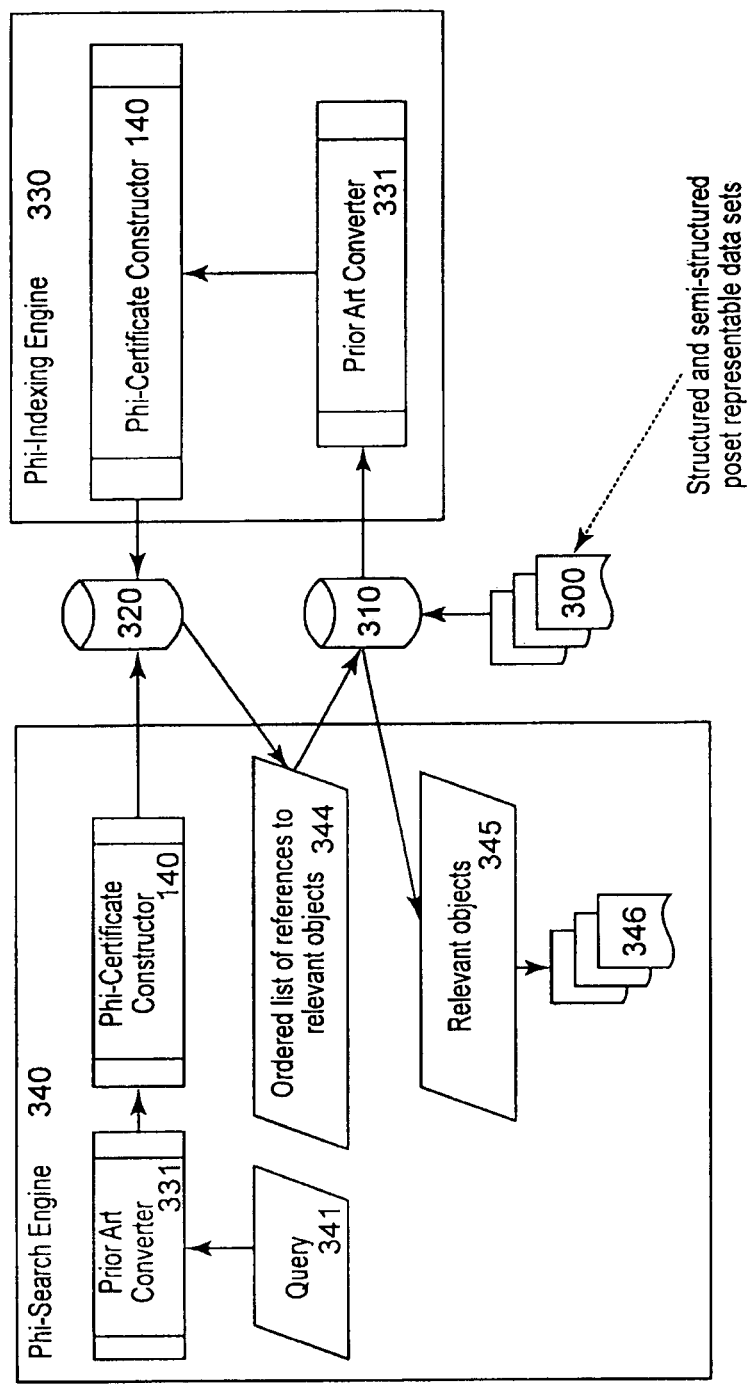
FIG. 3 illustrates the use of the Phi-certificate constructor for efficient data indexing and searching which may be integrated into prior art technology.

FIG. 3 illustrates one exemplary embodiment for creating Phi-databases which enable fast access and compact storage based upon the present invention. As described above, those of skill in the art will appreciate that Phi-indexing and Phi-certificate construction could be equivalently realized by (Iota,Omicron) certificate construction. FIG. 3 visualizes the interplay between the Phi-indexing 330 and Phi-search engine 340 which are coupled to a primary computer readable storage media 310 and secondary computer readable storage medium 320 via data transmitting and receiving means. The storage media 310 includes a collection of poset representable data sets 300. The storage media 320 includes a corresponding collection of poset data sets which are indexed by their Phi-isomorphism certificates. The Phi-indexing engine 330 firstly employs a converter 331 which is built using prior art technology and sequentially converts each of the poset representable data sets which is included in the storage media 310 into poset data sets; secondly the Phi-certificate constructor 140 which automatically constructs the Phi-isomorphism certificate corresponding to the received posets; thirdly indexes said poset data with their corresponding Phi-certificates, arranges the data sets according to the lexicographic ordering induced by the Phi certificates and stores them in the secondary computer readable storage medium 320. As recognized by those skilled in the art, the lexicographic ordering on the invented certificates provides a method for ranking and clustering information related to various objects representable as posets in a database, thereby avoiding storing redundant information and compacting the data sets stored on the media 310.

Given a certain query object 341, it is often necessary to identify entries in a given database 310 which are identical, isomorphic, or similar to this object. This retrieval operation is based on efficiently searching for candidates $C_1, \ldots, C_k$ in the Phi-database 320. The decision whether a candidate $C_i$ is isomorphic to a given reference object R can be based upon syntactic identity of the code pairs $Phi(C_i),Phi(R)$. The decision whether a candidate is identical to a given reference object R can be based upon syntactic identity of the code pairs $Phi(C_i),Phi(R)$ and syntactic identity of the code pairs Phi-alpha-sequence $(C_i)$ and Phi-alpha-sequence (R).

According to the requirements of the application, a similarity measure can be defined by a formula using frequencies of identical Phi-subcodes occurring in both the candidate and the reference object, a numerical distance measure between $Phi(C_i)$ and $Phi(R)$, or any other method to define a distance between sequences known in Information Retrieval and related research areas.

The Phi-search engine 340 takes advantage of the resulting transparent ordering of items in the database which accelerates retrieval of identical or similar objects. It generates an ordered list of references 344 to relevant objects 345 which may be then retrieved from the primary storage media 310.

It is known from prior art that a number of objects, especially semi-structured objects, can be bi-directionally converted into corresponding posets. Converters 331 which are built using prior art technology and which are used as preprocessors may perform these conversions. In some specific cases, the objects of interest can be directly considered as posets.

Construction of (Omicron,Iota) Code

An (Omicron(P), Iota(P)) code, further named (Omicron(n,h,r),Iota(r,s)) code, shortly referred to (Omicron,Iota) code, is being characterized in that:

Two posets P' and P'' are isomorphic if and only if their corresponding (Omicron,Iota)-codes (Omicron(P'),Iota(P')) and (Omicron(P''),Iota(P'')) are identical. Thus the invented (Omicron,Iota)-codes provide isomorphism certificates.

For a given poset P with n vertices, Iota(P) (=Iota(r,k)) is a sorted sequence of r sorted sequences Iota(P,$c_1$), . . . , Iota(P, $c_r$), where $c_1, \ldots, c_r$ refer to the r vertices of P which have at least two immediate predecessors and are named "cut vertices" further on. For each k, k=1, . . . , r, the length of Iota(P,$c_k$) is given by the number of immediate predecessors of $c_k$—the indegree of $C_k$—and s denotes the sum of those said r indegrees. Each element in Iota(P,$c_k$) is a position weight.

For a given poset P with n vertices, Omicron(P) (=Omicron(n,h,s)) is a sequence consisting of n numbers, which encode unique quantitative information about the number of outgoing edges of each vertex in P, and k position weights. Position weights quantify information about the occurrences and relationships among cut vertices as outlined in the following.

When given a sequence of objects, the relative order of the objects can be quantified by weights omega($o_i$) such that omega($o_i$)>omega($o_j$) if and only if $o_i$ precedes $o_j$. In the preferred embodiment of the present invention, the linear order of a sequence of objects ($o_1, \ldots, o_i, \ldots$) shall be quantified by omega($o_i$)=1/(i+1). As a variant, it is possible to quantify the strict order by omega($o_i$)=n+1/(i+1+m) if i,m,n denote integers.

For each distinct position weight, the total numbers of their occurrences in the Iota(r,s) and in the Omicron(n,h,s) sequence are identical. In a preferred embodiment, the outdegree of the parent vertex is used to quantify the outgoing edges from the parent vertex. As one other variant, it is possible to quantify the outgoing edges from a parent vertex by the number of all successors.

(Omicron(n,h,s),Iota(r,s)) can be partitioned in a unique way into a sequence of h subcodes, (($O_1,I_1$), ($O_2,I_2$), . . . , ($O_h,I_h$)) such that for each j,j=2, . . . , h, the pair ($O_j,I_j$) specifies an (Omicron,Iota) code for a designated multi-set forest, where h further on is named the hierarchy level of the associated poset.

One skilled in the art will recognize that the strategy of the encoder for constructing the Omicron code for multiset trees may be termed depth first traversal strategy. It would be equally possible to apply other traversal strategies—for example a breadth first strategy. For convenience of explanation only, the invention is described with reference to the depth first traversal. Those versed in the art will readily appreciate that the invention is, likewise, realizable with reference to other traversal strategies.

I. Given an arbitrary poset P, the Omicron-Iota encoding unit 112 produces an (Omicron(P), Iota(P)) code including the following steps:

a) If P is empty, then (Omicron(P), Iota(P))=([ ],[ ]).
  b) If P is not empty, then encoding of P comprises the steps of:

1) Determining the r cut vertices $c_1, \ldots, c_r$ which have at least two predecessors;
  2) Decomposing the poset P into a sequence of h multiset forests $MF_1, \ldots, MF_h$ such that P is the union of $MF_1, \ldots, MF_h$ and cut vertices are the exclusive vertices which occur more than once, each cut element is minimal in a specific or multitude of trees, the total number of occurrences correlates with the number of its predecessors, and cut vertices are root vertices in exactly one of the successive multiset forests. The sequence $MF_1, \ldots, MF_h$ is named "Phi-poset partitioning" of P.

Figure 4A:
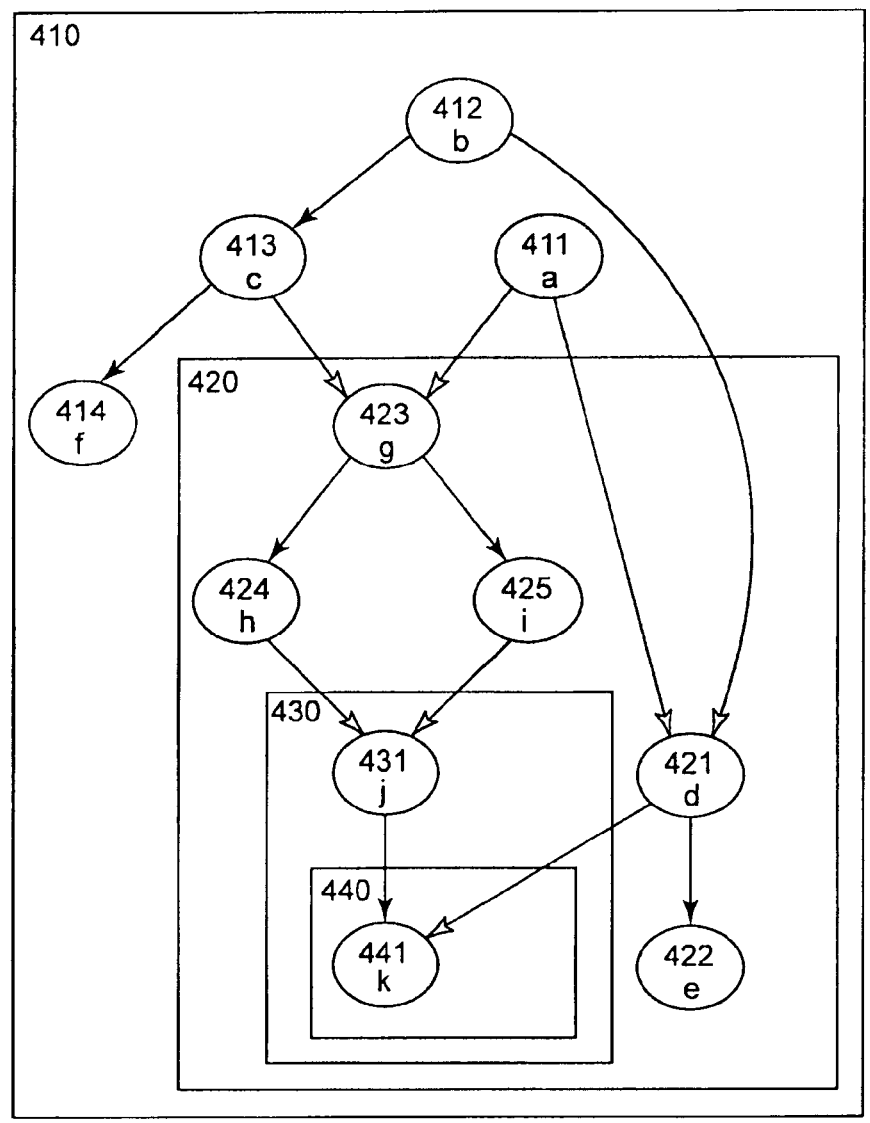
FIG. 4a illustrates a visualization of a Phi-poset decomposition.

FIG. 4a demonstrates an exemplary Phi-poset partitioning of a poset having hierarchy level 4 and built up from 11 vertices "a" through "k". The poset 410 includes the subposet 420 which further includes the subposet 430 and which includes the subposet 440. The subforest $MF_1$ comprises the vertices a,b,c, and f (411, 412, 413, 414). The subforest $MF_2$ on hierarchy level 2 comprises the vertices d, e, g, h (421, 422, 423 and 424). The subforest $MF_3$ on hierarchy level 3 consists of the vertex j (431) and the subforest $MF_4$ on hierarchy level 4 consists of the vertex k (441). The vertices d, g, j, and k (421, 423, 431, 441) are cut vertices, and the number of incoming edges of cut vertices sum up to 8. Dashed arrows mark cut edges.

3) Let $v_1, \ldots, V_d$ denote the maximal vertices of P. Define $MF_0:=[\ ]$ and omega-iota($MF_0,v_i$):=0, for i=1, . . . , d.
  4) Determining successively for each multiset forest $MF_i$, i=1, . . . h:
    i) and according to [II,a] the corresponding weighted isomorphism codes Omicron($MF_i$) and for each cut vertex $c_k$ the corresponding position vector Iota($MF_i$, $c_k$), k=1, . . . , r, wherein at each level the input weight of a vertex c which is maximal with respect to $MF_i$ is given by the weight omega-iota($MF_1, \ldots MF_{i-1}$,c);
    ii) for each cut element c, determining the code Iota($MF_1, \ldots, MF_{i-1}, MF_i$, c) which collects the occurrences of c in Omicron($MF_1$), . . . , Omicron($MF_{i-1}$), Omicron($MF_i$) by concatenating Iota($MF_1, \ldots, MF_{i-1}$, c) and Iota($MF_i$,c);
    iii) quantifying the lexicographic order of the position vectors Iota($MF_1, \ldots, MF_i,c_k$),k=1, . . . , r associated with cut vertices $C_k$ by weights omega-iota($MF_1, \ldots, MF_i, c_k$).
  5) Successively concatenating Omicron($MF_1$), . . . , Omicron($MF_h$) to yield Omicron(P).
  6) Determining Iota(P) as the sequence of the lexicographically sorted sequence of position vectors Iota($MF_1, \ldots, MF_h,c_1$), . . . , Iota($MF_1, \ldots, MF_h,c_r$) which belong to the cut vertices $c_1, \ldots, c_r$.

II. Given a multiset forest MF with maximal vertices $v_1, \ldots, v_d$ and input weights omega-iota($v_1$), . . . , omega-iota($v_d$), in an initial step a "parametric" version (Op(MF), Ip(MF)), Iota(MF)) code is constructed. Each occurrence of a cut edge ($c_k$,p), wherein p is an immediate predecessor of a cut vertex $C_k$ is assigned a position variable Pos($c_k$,p). Each position variable is furnished with an integer which is named distance. Initially, the position variables are pairwise disjoint and their distances are undefined. In a further step, each position variable which occurs in (Op,Ip)(MF) is instantiated by an appropriate weight to yield the numeric code (Omicron(MF),Iota(MF)).

a) Given a multiset forest MF with maximal vertices $v_1, \ldots, v_s$ and input weights omega-iota($v_1$), . . . , omega-iota($v_d$), the parametric code Op(MF), for each cut vertex $C_k$ the parametric vector Ip($c_k$) and a set of position variables Pos with their corresponding distances dist(MF,Pos) which occur in Op(MF) and Ip(NF) are constructed including the steps:
    1) Computing for each $v_j$, j=1, . . . , s the parametric multiset tree code Op($MTv_j$), with roots $V_j$, j=1, . . . , s, for each $c_k$ the position vectors Ip($MTv_j,c_k$) and for each distinct position variable Pos the distance dist($MTv_i$,Pos) according to [II,d], where $MTv_j$ denotes the maximal subtree of MF with root $V_j$;
    2) Preceding each code Op($MTv_j$) by the weight omega-iota($v_j$);
    3) Merging the parametric codes Op($MTv_1$), . . . , Op($MTv_d$) to yield Op(MF) and for each $c_k$ the position vectors Ip($MTv_1,c_k$), . . . , Ip($MTv_s,c_k$) to yield Ip(MF,$c_k$) and updating the position variables and their corresponding distances according to [II,e].

b) Given a parametric weighted code Op(ME) for a multiset forest MF, and for each cut vertex $c_k$, the parametric code Ip(MF,$c_k$) and an integer s, constructing Omicron(MF), and for each cut vertex $c_k$, the code Iota(MF,$c_k$) including the steps of:
    1) Ranking the position variables Pos which occur in Op(MF) by successive weights omega(Pos), preferably 1/(s+1),1/(s+2), . . . such that omega(Pos1)>omega(Pos2), Pos1, Pos2 in Pos if and only if dist(Pos1)<dist(Pos2);
    2) Constructing Omicron(MF) from Op(MF) by substituting each occurrence of a position variable Pos in Op(MF) with their corresponding weight omega(Pos);
    3) Constructing Iota(MF) from Ip(MF) by substituting each occurrence of a position variable Pos in Op(MF) with their corresponding weight omega(Pos).

c) Given a bipartite poset P which is represented by a multiset forest $MF=(MT_1, \ldots MT_d)$ with upper vertices $U=\{v_1, \ldots, v_s\}$, and lower vertices $L=\{w_1, \ldots, w_r\}$: constructing the parametric code Op($T_1, \ldots, T_d$), for each vertex $w_k$ the parametric position vectors Ip($MT_1, \ldots, MT_d, w_k$) in terms of position variables and for each distinct position variable Pos the distance dist($MT_1, \ldots, MT_d$,Pos), including the steps of:
    1) Selecting among the lower vertices a set $L_0$ of vertices characterized in that for each pair w in $L_0$, w' in $L\backslash L_0$:
      i) the ascending sorted sequence of the degrees of the immediate predecessors of w is lexicographically greater than the ascending sorted sequence of the degrees of the immediate predecessors of w', or they are identical, and
      ii) if $|N(v') \wedge N(v'')|$ denotes the number of common immediate predecessors in P for a pair of cut vertices v',v" then:
        $(|N(w) \wedge N(w_1')|, \ldots, |N(w) \wedge N(w_d)|) > (|N(w') \wedge N(w_1')|, \ldots, |N(w') \wedge N(w_d')|)$, if $(w_1, \ldots, w_d)$, respectively $(w_1', \ldots, w_d')$ denote the sequence of the lower vertices that are neighbors of w, respectively w' and which are sorted such that $|N(w)/\wedge N(w_1)|>= \ldots >=|N(w) \wedge N(w_d)|$ and $|N(w') \wedge N(w_1')|>= \ldots >=|N(w') \wedge N(w_d')|$;

2) Associate each w in $L_0$ with a position variable X and dist(X):=½ and for each neighbor w' of w in $L_0$: Ip(w):=[X]; ExpLB:=L\$L_0$, k:=1;
3) While ExpLB contains at least one vertex:
   i) Select the subset of vertices $L_k$ of ExpLB: such that for each pair w in $L_k$, w' in ExpLB$_k$\$L_k$: [1/dist($X_1$), ..., 1/dist($X_r$)]>[1/dist($Y_1$) ..., 1/dist($Y_s$)] if Ip(w)=[$X_1$, ..., $X_r$] and Ip(w')=[$Y_1$, ..., $Y_s$], whereas the position variables are sorted such that dist($X_1$)< ... <dist($X_r$) and dist($Y_1$)< ... <dist($Y_s$);
   ii) For each neighbor w in ExpLB of v in $L_k$ update the vector Ip(w), Ip(w):=append(Ip(w),Y) or Ip(w):=[Y], whereas Y denotes a newly introduced distinct position variable and dist(Y):=dist.
   iii) ExpLB:=ExpLB\$L_k$; k:=k+1; dist:=dist+|$L_k$|.
4) Let MinL denote the set of vertices which is finally processed by the loop 3). For each neighbor w' in L of w in Min, update the corresponding vector Ip(w'), Ip(w'):=append(Z,Ip(w')), whereas Z denotes a newly introduced distinct position variable and dist(Z):=(N+1);
5) Initially define ExpLT:=L\MinL; k:=1; dist:=1/(N) and the parametric code Ip(MF):=[Z−Ip($w_1$), ..., Z−Ip($w_r$)];
6) While ExpLT contains at least one vertex:
   i) Select the subset of vertices $L_k$ of ExpLT: such that for each pair w in $L_k$, w' in ExpLT\$L_k$: [1/dist($X_1$), ..., 1/dist($X_r$)]≦[1/dist($Y_1$) ..., 1/dist($Y_s$)] if Ip(w)=[$X_1$, ..., $X_r$] and Ip(w')=[$Y_1$, ..., $Y_s$], whereas the position variables are sorted such that dist($X_1$)< ... <dist($X_r$) and dist($Y_1$)< ... <dist($Y_s$);
   ii) For each neighbor w in ExpLB of v in $L_k$ update the vector Ip(w), Ip(w):=append(Y,Ip(w)) or Ip(w):=[Y], whereas Y denotes a newly introduced variable and update Ip(MF), Ip(MF):=append([Y−Ip($w_1$), ..., Y−Ip($w_s$)], Ip(MF)) whereas $L_k$=($w_1$ ..., $w_s$)
   iii) ExpLT:=ExpLT\$L_k$; k:=k+1; dist:=dist−|$L_k$|.
7) Ip($MT_1$, ..., $MT_d$, $w_k$):=Ip($w_k$)
8) Successively for each multiset tree $MT_i$ with root $v_i$ and edges ($v_i$,w) construct its code Op($MT_i$):=[deg($v_i$), $X_1$, ..., $X_d$] wherein deg($v_i$) refers to the outdegree of $v_i$. Each occurrence of the position variables $X_1$, ..., $X_d$, corresponds with an edge ($v_i$,$w_j$) which shall be arranged such that $X_i$ precedes $X_j$ in O($MT_i$) if dist($X_i$)<dist($X_j$);
9) Arrange and unify the parametric codes Op($MT_1$), ..., Op($MT_r$) belonging to the upper level vertices {$v_1$, ..., $v_d$} recursively such that a maximal code Op($MT_i$) with root v* is characterized in that [deg(v*),1/dist($X_1$), ..., 1/dist($X_d$)]>[deg($v_j$),dist($Y_1$), ..., 1/dist($Y_d$)], j=1, ..., d, or [deg(v*),1/dist($X_1$), ..., 1/dist($X_d$)]=[deg($v_j$),dist($Y_1$), ..., 1/dist($Y_d$)], j=1, ..., d and for each upper vertex v': (|N(v*) ∧ N($v_1$)|, ..., |N(v*) ∧ N($v_d$)|)>=(|N(v*) ∧ N($v_1'$)|, ..., |N(v') ∧ N($v_d'$)|), if ($v_1$, ..., $V_d$), respectively ($v_1'$, ..., $v_d'$) denote the sequence of the upper vertices that are neighbors of v*, respectively v' and which are sorted such that |N(v*) ∧ N($v_1$)|>= ... >=|N(v*) ∧ N($v_d$)|, |N(v') ∧ N($v_1'$)|>= ... >=|N(v') ∧ N($v_d'$)| and for any pair of upper level vertices $v_i$,$v_j$, Op($MT_i$)=Op($MT_j$) if and only if the computed Omicron codes of each of the neighbors of $v_i$ and $V_j$ are pairwise identical. If two codes are equal, then unify the two codes and apply the variable substitutions to the Iota codes.
10) Concatenate the arranged and unified parametric codes Op($MT_1$), ..., Op($MT_r$) to yield Op($MT_1$, ..., $MT_d$).

d) Suppose a multiset forest consists of a multiset tree MT with root v, being $w_j$, j=1, ..., d the immediate successors of v, and cut vertices $c_1$, ..., $c_v$, constructing the parametric code Op(T,v), including the steps:
   1) If MT has no successors, setting Op(MT):=[0] and Ip(MT):=[ ];
   2) If MT is a bipartite poset, perform the constructions according to [II,c];
   3) For the general case:
      i) remove the root of MT and let MF denote the resulting multiset forest with roots $v_1$, ..., $v_s$, constructing Op(MF) and for each cut vertex $c_k$, k=1, ..., r, Ip(MF,$c_k$) according to [II,b], wherein omega-iota($v_1$)=0, ..., omega-iota($v_s$)=0 are used as input weights;
      ii) precede the code O(MF) by a unique number which in the preferred embodiment refers to the outdegree of the root of MT to yield Op(MT);
      iii) for each cut vertex $C_k$ Ip(MT,$c_k$)=Ip(MF,$c_k$) and for each position variable dist(MT,Pos)=dist(MF,Pos).
e) Given a sequence of parametric codes Op($MTv_1$), ..., Op($MTv_d$) and for each cut vertex $c_k$ the position vectors Ip($MTv_1$,$c_k$), ..., Ip($MTv_s$,$c_k$) in terms of position variables and their distances; the parametric codes are merged into the codes Op($MTv_1$, ..., $MTv_d$) and for each for each cut vertex $c_k$ the fused position vector Ip($MTv_1$, ..., $MTv_s$,$c_k$) is determined and the position variables and their corresponding distances are updated according to the following rules:
   1) Constructing a sequence of bipartite parametric multiset trees Op($MT_1$), ..., Op($MT_d$) as follows: i) the root vertices $v_1$, ..., $v_d$ denote the upper vertices U; ii) each non-root vertex w in Op($MTv_i$) having multiple predecessors among the root vertices $v_1$, ..., $v_d$ with respect to Op($MTv_1$), ..., Op($MTv_d$) is associated with a lower vertex v in L; (iii) there is a connecting edge between an upper vertex $u_i$ and a lower vertex v, if and only if $u_i$ is a predecessor of v with respect to the original multiset forest;
   2) Determining the merged parametric Omicron code Op($MT_1$, ..., $MT_d$) and for each w in L, the corresponding parametric Iota code Ip($MT_1$, ..., $MT_d$,w) in terms of position variables and for each distinct position variable Pos the distance dist($MT_1$, ..., $MT_d$,Pos), according to [II,c];
   3) Generate OP($MTv_1$, ..., $MTv_d$) and for each cut vertex $c_k$, the fused position vector Ip($MTv_1$, ..., $MTv_d$, $C_k$) including the following steps:
      i) Update the position variables which occur in Op($MTv_i$) and replace them by their counterparts in Op($MT_i$);
      ii) Successively for each multiset tree $MTv_i$ with root $v_i$, consider its updated code Op($MTv_i$). Arrange the newly introduced position variables $X_1$, ..., $X_d$, which occur in $MTv_i$ such that $X_i$ precedes $X_j$ in O($MTv_i$) if dist($X_i$)>dist($X_j$) and $X_i$, $X_j$ have a common immediate predecessor;
      ii) Sort the updated codes such that Op($MTv_i$)>Op($MTv_j$) if there is an instantiation sigma of position variables such that sigma(Op($MTv_i$))>sigma(Op($MTv_j$)) or Op($MTv_i$)=Op($MTv_j$) if there is an instantiation sigma of position variables with distinct values such that sigma(Op($MTv_i$))=sigma(Op($MTv_j$)). In the case Op($MTv_i$)=Op($MTv_j$), unify them and apply the variable substitutions to Ip($MT_1$, ..., $MT_d$,v);
      iii) For each cut vertex $w_k$ which has multiple predecessors among the root vertices $v_1$, ..., $v_d$: Ip($MTv_1$, ..., $MTv_d$, $w_k$):=append(Ip($MTv_1$, $w_k$), ..., Ip($MTv_d,w_k$),Ip($MT_1$, ..., $MT_d$,v)), for each other cut vertex Ip($MTv_1$, ..., $MTv_d$, $w_k$):=append (Ip($MTv_1,w_k$), ..., Ip($MTv_d,w_k$));

iv) Concatenate the sorted parametric codes Op($MTv_1$), ..., OP($MTv_r$) to yield Op($MTv_1$, ..., $MTv_d$).

Phi-Symmetry Ranking

An automorphism is an isomorphic mapping of the vertices onto themselves. The set of all automorphisms of a given poset is the base of the automorphism group of the poset. The automorphisms of a poset define the automorphism partition of its vertices in the following way: two vertices v',v" are in the same automorphism class if there exists an automorphism which maps v' onto v". Poset automorphism classes are used for modeling symmetric vertices. In addition, the symmetry classes of a poset are further ranked by the Phi-symmetry ranks. The Phi-symmetry ranking is necessary to construct the minimal Phi-isomorphism code.

The Phi-symmetry ranker 120 assigns each poset vertex v its Phi-symmetry rank Phi-sym(v), such that symmetric vertices have identical Phi-symmetry rankings, the Phi-symmetry ranks for pairs of symmetric vertices differ, and the Phi-symmetry ranking results in a strict linear order for the symmetry clusters. Further on, all poset vertices are partitioned into symmetry clusters, each of which consists of symmetric vertices and pairs of vertices from different clusters are non-symmetric.

The Phi-symmetry ranker 120 receives a poset 121, and transfers it to the (Omicron,Iota) certificate constructor 110 which constructs the (Omicron,Iota) certificate 113 which comprises for each cut vertex its Iota-code. The codes 113 are received by the Phi-symmetry ranking unit 122 and then used to construct the ranked Phi-symmetry partition 123.

The Phi-symmetry ranking unit 122 assigns the poset root the minimum Phi-symmetry rank; the poset vertices are arranged into layers such that vertices assigned to a given layer have identical maximal distance to the root; the layers are sorted such that the vertices on a preceding layer have a smaller distance to the source than vertices on a succeeding layer. In a first step, successively for each layer, Phi-symmetry weights are assigned to all the vertices that belong to a layer, starting with the root and proceeding the layers top-down; and in a second step by proceeding from the vertices having maximal distance to the root, the vertices are assigned the said Phi-symmetry ranks. The vertices are assigned Phi-symmetry weights in such a way that the symmetry weights at a preceding layer are less than the weights at a succeeding layer; and the Phi-vertex-symmetry ranks at a preceding layer are less than the Phi-vertex-symmetry ranks at a succeeding layer.

On each layer, the Phi-symmetry ranking unit 122 assigns the vertices Phi-symmetry weights and ranks according to the following rules:

a) Assign the root vertex the minimal Phi-symmetry rank Phi-sym(root)=1 and the input weight Phi-omega(root)=0.

b) Successively for each layer i, i>0 recursively

1) Determining for each vertex v belonging to the layer i an initial Phi-symmetry weight Phi-omega(v) such that
    (i) the symmetry weights at a preceding layer are less than the weights at a succeeding layer
    (ii) for each pair of non-cut vertices v',v": Phi-omega(v')<Phi-omega(v") if Phi-omega(u')<Phi-omega(u") or Phi-omega(u')=Phi-omega(u") and deg(v')>deg(v"), Phi-omega(v')=Phi-omega(v") if and only if Phi-omega(u')=Phi-omega(u") and deg(u')=deg(u") where U', U" denote the immediate predecessors of v', respectively v";

(iii) for each pair of cut vertices v',v": Phi-omega(v')<Phi-omega(v") if and only if Iota(v')<Iota(v") and Phi-omega(v')=Phi-omega(v") if and only if Iota(v')=Iota(v");

(iv) for each pair of vertices v',v" wherein v' is a cut vertex and v" is a non-cut vertex: Phi-omega(v')<Phi-omega(v") if there exists a predecessor u' of v' such that Phi-omega(u')<Phi-omega(u") where u" denotes the immediate predecessor of v", otherwise Phi-omega(v')>Phi-omega(v").

2) Recursively constructing for each vertex v belonging to the layer i+1 the Phi-symmetry rank Phi-sym(v) wherein the Phi-symmetry rankings of vertices without successors coincide with their Phi-symmetry weights.

3) For each vertex v belonging to the layer i, arranging the Phi-symmetry ranks of its immediate successors ($v_1,v_2, ..., v_d$) in non-decreasing lexicographic order such that Phi-sym($v_1$)<=Phi-sym($v_2$)=< ... =<Phi-Sym ($V_d$).

4) Assign each vertex v on layer i its Phi-symmetry rank Phi-sym(v) such that for each pair of vertices v',v":
    (i) Phi-sym(v')<Phi-sym(v") if and only if (Phi-sym ($v_1'$),Phi-sym($v_2'$), ..., Phi-sym($v_{d1}'$))<(Phi-sym ($v_1''$),Phi-sym($v_2''$), ..., Phi-sym($v_{d2}''$))
    (ii) Phi-sym(v')=Phi-sym(v") if and only if (Phi-sym ($v_1'$), Phi-sym($v_2'$), ..., Phi-sym($v_d'$))=(Phi-sym ($v_1''$),Phi-sym($v_2''$), ..., Phi-sym($v_{d2}''$)) where ($v_1'$, $v_2'$, ..., $v_{d1}'$), ($v_1''$,$v_2''$, ..., $v_{d2}''$) denote the immediate set of successors of v', respectively v".

Characterization and Construction of Topological Phi-alpha-Ranking

A Phi-alpha-ranking is a mapping Phi-alpha: V ⇐ {1, 2, ..., n} if V denotes the vertex set of a poset P and the sequence ($v_1$, ..., $v_n$), Phi-alpha($v_1$)=1, ..., Phi-alpha($v_n$)=n is a topological sort. A topological sort is a linear ranking of the vertices of a poset in which all the successors of any given vertex appear in the sequence after that vertex. There are many ways to generate a topological sort. The designated Phi-alpha ranking of the vertices is used to construct the minimal Phi-isomorphism certificate. Given a linear order alpha on the vertices V of the poset P, for example, the alphabetical sorting of the vertex names, a canonical topological sort of the vertices of P, named Phi-alpha sequence is constructed by the Phi-alpha topological vertex ranker 130. The Phi-alpha topological vertex ranker 130 receives a poset 131, transfers it to the Phi-symmetry ranker 120 which partitions the vertices into symmetry classes and ranks the classes and outputs for each vertex v its Phi-symmetry rank Phi-sym(v), which is then used by the topological Phi-alpha topological vertex ranking unit 132 for constructing for each vertex the topological Phi-alpha vertex ranking Phi-alpha(v) 133, further comprising the following steps.

The Phi-alpha topological vertex ranking unit 132 arranges the vertices into layers by proceeding from the poset root vertex to the vertices having maximal distance from the root, on each layer the vertices have the same distance to the root; the layers are sorted such that the vertices on a preceding layer have a smaller distance to the root than vertices on a succeeding layer; the poset root is assigned the Phi-alpha rank 0; for each vertex u on a preceding layer the Phi-alpha-rank Phi-alpha(u) is less than any Phi-alpha-rank Phi-alpha(v) for a vertex v on a succeeding layer; on each layer a first vertex v' precedes a second vertex v" according to the Phi-alpha-ranking if the Phi-symmetry ranking Phi-sym(v') is less than the Phi-symmetry ranking Phi-sym(v") of the second vertex; or their Phi-symmetry rankings are identical and the sorted sequence of the Phi-alpha rankings of the successors of the first vertex lexicographically precedes the sorted sequence of the Phi-alpha rankings of the successors of the second vertex; or their Phi-symmetry rankings are identical, furthermore the set of successors of the first and the second vertex is empty, and the first vertex precedes the second vertex by an arbitrary provided alpha order on vertices.

Figure 4B:
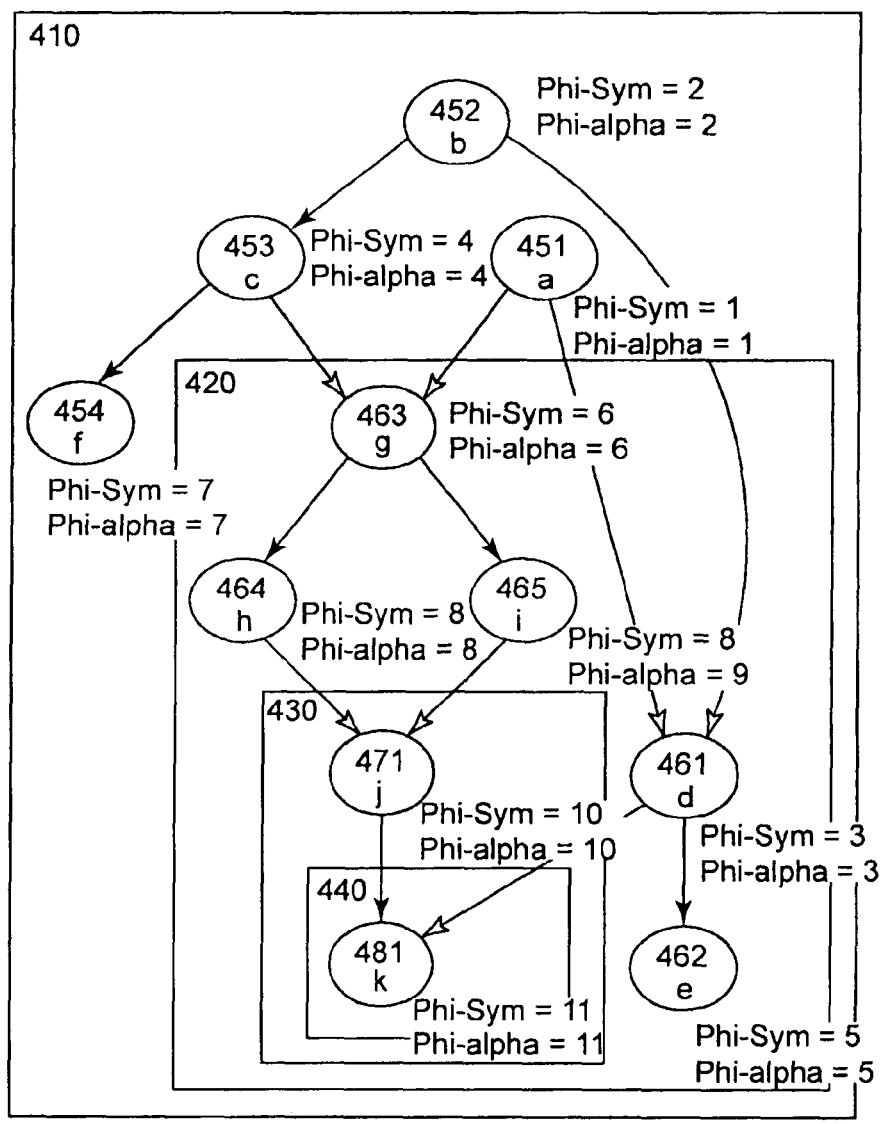
FIG. 4b illustrates a visualization of the poset of FIG.

FIG. 4b illustrates an exemplary representation in which the vertices of the exemplary poset of FIG. 4a are labeled with their corresponding Phi-vertex symmetry ranks Phi-sym and their topological Phi-alpha vertex rank Phi-rank. As it is apparent from FIG. 4b, vertices h (464) and i (465) are the only symmetric vertices for the poset 410. Assuming that alpha denotes the alphabetical order, we can derive for the two vertices h and i that $h<_{alpha} i$ holds. Therefore, the topological Phi-vertex rank of the vertex h (464) must be less than the topological vertex rank of the vertex i (465). A topological sorting which is induced by the Phi-alpha vertex ranking is given by the sequence a, b, d, c, e, g, f, h, i, j, k (in FIG. 4b, this corresponds to the sequence 451, 452, 461, 453, 462, 463, 454, 464, 465, 471, 481).

As it is obvious from the above construction, if a poset has no symmetries, then the corresponding Phi-alpha-sequence is self-contained without any reference to an alpha-order and Phi-symmetry ranks and Phi-topological vertex ranks coincide.

Characterization and Construction of Phi-Isomorphism Certificate

A minimal Phi(P)-isomorphism type, shortly referred to as Phi-code, is being characterized in that:

Two posets $P_1$ and $P_2$ are isomorphic if and only if their corresponding Phi-codes: $Phi(P_1)$ and $Phi(P_2)$ are identical. Thus, the Phi-codes provide isomorphism certificates.

Phi(P) is a sequence of number pairs $((i_1,j_1), \ldots, (i_m, j_m))$ which represents a poset with base set $\{1, \ldots, n\}$ and Phi(P)~P (Phi(P) is isomorphic to P). Furthermore, Phi(P) is minimal in the sense that for each poset P' with vertices $\{1, \ldots n\}$ and P'~P: Phi(P) ≦ P'.

Referring again to FIG. 1, the Phi-certificate constructor 140 receives a poset P 141 and transfers it to the Phi-topological vertex ranker 130 which constructs the topological Phi-vertex ranking 133 and which then is received by the Phi-Isomorphism encoding unit 142. Using the topological Phi-ranking, the poset P is converted into the Phi-code Phi(P) by successively mapping all relations (u,v) into pairs (Phi-alpha(u),Phi-alpha(v)), and lexicographically sorting the list of pairs such that the smallest pairs appear first and concatenating the sorted list of pairs. The resulting poset 143 represents the minimal Phi(P) isomorphism type.

It is noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise. The invention can also be embodied in and carried out by a microprocessor or microcontroller.

The term storage medium is intended to include any machine readable storage medium, e.g., a CD-ROM, DVD, tape device or chip card, any primary storage like a computer system memory or random access memory or a non-volatile memory such as a magnetic media, e.g., a hard drive, or optical storage. The storage medium may comprise other types of memory as well, or combinations thereof. In addition, the storage media may be located in remote devices which connect to the processors over a network, such as the Internet.

Referring now to FIG. 5, there is illustrated one embodiment of a processing device 18 in accordance with the present invention. Processing device 500 includes primary computer readable storage media 310, secondary computer readable storage medium 320, a processor 510, a user interface device 520 and an output device 530. Primary computer readable storage media 310 may include any machine readable storage medium, e.g., a CD-ROM, DVD, tape device or chip card, any primary storage like a computer system memory or random access memory or a non-volatile memory such as a magnetic media, e.g., a hard drive, or optical storage, or any combination thereof. Primary computer readable storage media 310 may store one or more applications 540, including system software 550, and a web server 560, for execution by processor 510.

Secondary computer readable storage medium 320 may include any machine readable storage medium, e.g., a CD-ROM, DVD, tape device or chip card, any primary storage like a computer system memory or random access memory or a non-volatile memory such as a magnetic media, e.g., a hard drive, or optical storage, or any combination thereof. Processor 510 may execute system software 550 and other applications 540 stored in primary computer readable storage media 310 and/or secondary computer readable storage medium 320. Processor 510 may execute system software 550 in order to provide the fictions described in this specification including, but not limited to constructing (Omicron,Iota) certificate 113, ranked Phi-symmetry partition 123, topological Phi-vertex ranking 133 and/or topological Phi-vertex ranking 133.

User interface device 520 may include any device for entering information into processing device 500, such as a keyboard, mouse, cursor-control device, touch-screen, infrared, microphone, digital camera, video recorder, or any other instrument or device necessary to conduct fast computation of compact posets isomorphism certificates. Output device 530 may include any type of device for presenting a hard copy of information, such as a printer, and other types of output devices including speakers or any device for providing information in audio form.

Web server 560 is used to provide access to program for conducting fast computation of compact posets isomorphism certificate stored in primary computer readable storage media 310 and/or secondary computer readable storage medium 320 and display data, results and any other information obtained therefrom. Web server 560 allows users secure remote access to the system. Web server 560 can allow access to a user running a web browser. Any web browser, co-browser, or other application capable of retrieving content from a network and displaying pages or screens may be used. Examples of processing devices 500 used to conduct fast computation of compact posets isomorphism certificates include embedded microprocessors, digital signal processors, personal computers, laptop computers, notebook computers, palm top computers, network computers, Internet appliances, or any processor-controlled device capable of storing data, system software 550 and any other type of application 540 stored in or accessible via primary computer readable storage media 310 and/or secondary computer readable storage medium 320.

Referring now to FIG. 6 there is shown an exemplary arrangement of a computer network 600 in which one embodiment of the method of the present invention is conducted. A user terminal 610 may include primary computer readable storage media 310, secondary computer readable storage medium 320, processor 510, user interface device 520 and output device 530 as described above with regard to FIG. 5. In another embodiment, primary computer readable storage media 310, secondary computer readable storage medium 320 can be located remote from user terminal 610, for example in a first server 660 and/or a second server 670. User terminal 610 can communicate with first server 660 and/or second server 670 via the Internet 620. User terminal 610 can also communicate with various wireless devices 640, 650 via the Internet 620 through a mobile network infrastructure 630. In one embodiment, user terminal 610 can communicate with other user terminals and/or with wireless devices 640 through peer-to-peer communication methods. The peer-to-peer communication methods include wireless communication between various user terminals 610 and/or wireless devices 640, 650. In this manner, many users can access, modify, add, store, etc. poset data and/or poset isomorphism certificates in accordance with the present invention.

While the invention has been described with reference to the specific embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

It will be understood that the present invention is applicable to many different data types. Examples of appropriate digital data objects include the following types of objects used in the various fields of computation: in digital media technology: CAD model, image, vector based graphics, 3D model, the topology of a distributed multi media application; in information technology: taxonomy, financial network, RDF document, XML document, HTML coded Web page, binary decision diagram, a linguistic expression, a logical sentence, a Boolean truth table, circuit diagram, scanned document, compiler, computer program, binary executable, VLSI layout graph; in chemical and biological applications: 2D chemical structure diagram, 3D chemical structure diagram, DNA sequence, genetic maps, multiple sequence alignments, biopathway, stoichiometric structure of reaction system, Gene Ontology digraph, hydrocarbons, drug components, RNA; in biometric data processing: fingerprint graph, handwritten graphical symbol; in graph-based modeling: communication networks, transportation network, electrical circuit, power grid, computer network, social network, the World Wide Web graph, intranets.

What is claimed is:

1. A fast computer-implemented method for computing compact numerical (Omicron,Iota) isomorphism certificates for one or more poset-representable digital data objects $D.sub.1, \ldots D.sub.n$ with inherent poset structures $P.sub.1, \ldots P.sub.n$, providing means for certifying isomorphism between two poset structures, if their corresponding (Omicron,Iota) certificates match, thus enabling structure-based access to complex and large data sets, as well as comparison, sorting and clustering thereof to be performed by efficient numerical operations on said certificates derived from and representing the data objects contained in these data sets, comprising successively for $j=1, \ldots n$, the steps of: loading a poset-representable digital data object $D.sub.j$ and extracting the inherent poset structure $P.sub.j$;
computing the isomorphism certificate (Omicron($P.sub.j$), Iota($P.sub.j$)) for the poset $P.sub.j$; storing the isomorphism certificate (Omicron($P.sub.j$),Iota($P.sub.j$)) in a storage medium, wherein a poset-representable data object $D.sub.j$ can be construed as being composed of a set of components $c.sub.1, \ldots c.sub.m$ which are represented as the vertices of the poset, and a partial order relation defined on the set of components which expresses relevant features of the data object $D.sub.j$,
and further wherein for each poset $P.sub.j$: (Omicron($P.sub.j$),Iota($P.sub.j$)) a pair of number sequences is designated whose total length is proportional to the number of edges in $P.sub.j$, and the code Iota($P.sub.j$) is a concatenation of r sorted sequences Iota($P,c.sub.1$), ..., Iota($P,c.sub.r$), where $c.sub.1, \ldots, c.sub.r$ are r cut vertices of $P.sub.j$ which have at least two immediate predecessors, and wherein, for each cut vertex $c.sub.k$, each incoming edge is associated with a position weight, the length of Iota($P.sub.j,c.sub.k$) is given by the number of incoming edges, and each element in Iota($P.sub.j,c.sub.k$) is a position weight, and the code Omicron($P.sub.j$) for a poset P represents for each non-cut vertex the number of outgoing edges and Iota position weights for outgoing edges to cut vertices and wherein said position weights particularly quantify the subposets in which the edges occur and numerical relationships among cut vertices, and wherein said position weights are associated with integers representing distances,
and further wherein the (Omicron($P.sub.j$),Iota($P.sub.j$)) certificate canonically represents a set of poset-representable digital data objects in the plurality $D.sub.1, \ldots D.sub.n$ which have poset structures isomorphic to $P.sub.j$.

2. The method of claim 1, wherein said one or more data objects is selected from one or more of a CAD model, image, vector based graphics, 3D model, topology of a distributed multi media application; taxonomy, financial network, RDF document, XML document, HTML coded Web page, binary decision diagram, linguistic expression, logical sentence, Boolean truth table, circuit diagram, scanned document, compiler, computer program, binary executable, VLSI layout graph, 2D chemical structure diagram, 3D chemical structure diagram, RNA sequence, DNA sequence, genetic maps, multiple sequence alignments, biopathway, stoichiometric structure of reaction system, Gene Ontology digraph, hydrocarbons, drug components, fingerprint graph, handwritten graphical symbol, communication networks, transportation network, electrical circuit, power grid, computer network, social network, World Wide Web graph, and intranet structure.

3. The method of claim 1, wherein computing an Omicron-Iota isomorphism certificate for said poset $P.sub.j$ comprises: repeatedly Phi-poset-partitioning the poset $P.sub.j$ into a top maximal multiset forest named MF and a remaining poset P', wherein the top maximal multiset forest MF is configured such that only designated cut vertices have multiple occurrences; determining an (Omicron,Iota) code for the top maximal multiset forest MF and the Iota weights for the cut vertices occurring in top maximal multiset forest MF; recursively determining a weighted (Omicron,Iota) code for the remaining poset P' taking the previously computed Iota weights as inputs; and concatenating the (Omicron,Iota) codes for the top maximal multiset forest MF and the (Omicron,Iota) code for the remaining poset P' to yield an overall (Omicron,Iota) code for the poset $P.sub.j$; wherein constructing for the top maximal multiset forest MF and the corresponding weighted (Omicron,Iota) certificate comprises: recursively decomposing the top maximal multiset forest MF into bipartite posets; determining the (Omicron,Iota) codes for the bipartite posets; and arranging the bipartite posets to yield the (Omicron,Iota) code for the top maximal multiset forest MF.

4. The method of claim 1 further comprising: comparing a plurality of digital data objects $D_1, \ldots, D_n$ by using the Omicron-Iota($P_j$), j=1, ..., n, codes of the corresponding posets $P_1, \ldots, P_n$; arranging $D_1, \ldots, D_n$ into sorted clusters such that: (i) for any pair of objects D',D" in the same cluster the associated Omicron-Iota codes are identical, whereby identity of (Omicron(P'),Iota(P')) and (Omicron(P"),Iota(P")) for a pair of posets P',P" taken from the set $P_1, \ldots, P_n$, certifies that P' is isomorphic to P", and (ii) the clusters are sorted according to the ordering induced by the codes (Omicron(P),Iota(P)).

5. A computerized system for performing the method of claim 1 comprising:
- a processor;
- a primary storage medium, configured to store one or more data objects;
- a code segment for receiving one or more of said objects from the primary storage medium, each data object being representable by a poset;
- a code segment for converting one or more of said data objects into posets;
- a code segment for computing said Omicron-Iota isomorphism certificates for the generated posets;
- a code segment for indexing the posets with the said Omicron-Iota isomorphism certificates;
- a code segment for arranging the posets according to the lexicographic order induced by said isomorphism certificates assigned to the posets; and
- a code segment for storing the Omicron-Iota indexed posets together with links to the corresponding data objects in a machine readable secondary storage medium.

6. The system of claim 5, further comprising a search engine, said search engine having code segments configured for receiving a query expression, wherein the search query expression specifies a desired data objects by structural and content constraints or a query-by-example method, the objects being capable of being represented by a poset;
- transforming the query expression into a query poset;
- computing for the query poset the corresponding Omicron-Iota isomorphism certificate;
- retrieving posets having said isomorphism certificates that match the Omicron-Iota isomorphism certificate of the query poset from a plurality of data sets in the secondary storage medium;
- extracting for each of the retrieved posets a link to corresponding data objects stored in the primary storage medium; and
- generating an ordered list of references to relevant objects that have a poset structure isomorphic to the query poset and can be retrieved from the primary storage medium.

* * * * *